US012711822B2

(12) United States Patent
Yu

(10) Patent No.: US 12,711,822 B2
(45) Date of Patent: Aug. 18, 2026

(54) CHARGING METHOD, APPARATUS, AND SYSTEM

(71) Applicant: Yinwang Intelligent Technologies Co., Ltd., Shenzhen (CN)

(72) Inventor: Guojun Yu, Shanghai (CN)

(73) Assignee: YINWANG INTELLIGENT TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/147,517

(22) Filed: Dec. 28, 2022

(65) Prior Publication Data

US 2023/0177903 A1 Jun. 8, 2023

Related U.S. Application Data

(63) Continuation of application No. PCT/CN2020/099210, filed on Jun. 30, 2020.

(51) Int. Cl.
*G07C 9/00* (2020.01)
*B60L 53/14* (2019.01)
(Continued)

(52) U.S. Cl.
CPC .......... *G07C 9/00896* (2013.01); *B60L 53/14* (2019.02); *B60L 53/68* (2019.02); (Continued)

(58) Field of Classification Search
CPC ..... G07C 9/00896; B60L 53/68; B60L 53/14; B60L 53/65; B60L 2240/72; H02J 7/40; G06Q 10/02; G06Q 50/06
See application file for complete search history.

(56) References Cited

U.S. PATENT DOCUMENTS 8,401,875 B2 * 3/2013 Fish .................... A61B 5/0002 705/3
10,861,265 B1 * 12/2020 Merkley ................ G06V 20/52
(Continued)

FOREIGN PATENT DOCUMENTS

CA 3098258 A1 10/2019
CN 106926720 A 7/2017
(Continued)

OTHER PUBLICATIONS

Yan, Jianghui, Tseng, Fang-Mei, and Lu, Louis Y.Y., "Developmental trajectories of new energy vehicle research in economic management: Main path analysis," Technological Forecasting & Social Change, 137, 2018, pp. 168-181.*

*Primary Examiner* — Nathan Erb
(74) *Attorney, Agent, or Firm* — Conley Rose, P.C.

(57) ABSTRACT

A charging method in the field of vehicle technologies includes obtaining charging reservation information of an electric vehicle and target unlocking information of a charging port cover of an electric vehicle, generating a charging reservation request based on the charging reservation information and the target unlocking information, and sending the charging reservation request to a charging server, where the charging server may further send the target unlocking information to an unlocking device, so that when the electric vehicle needs to be charged by using the mobile charging vehicle, the unlocking device may unlock a charging port cover of the electric vehicle based on the target unlocking information.

19 Claims, 16 Drawing Sheets

(51) Int. Cl.

| | |
|---|---|
| ***B60L 53/68*** | (2019.01) |
| ***G06Q 10/02*** | (2012.01) |
| ***G06Q 50/06*** | (2012.01) |
| ***H02J 7/40*** | (2026.01) |
| *B60L 53/65* | (2019.01) |

(52) U.S. Cl.

CPC ............. *G06Q 10/02* (2013.01); *G06Q 50/06* (2013.01); *H02J 7/40* (2026.01); *B60L 53/65* (2019.02); *B60L 2240/72* (2013.01)

(56) References Cited

U.S. PATENT DOCUMENTS

| | | | | |
|---|---|---|---|---|
| 2016/0344747 | A1* | 11/2016 | Link, II | H04W 4/021 |
| 2017/0372547 | A1 | 12/2017 | Fujiwara et al. | |
| 2018/0072177 | A1* | 3/2018 | Tremblay | B60L 53/665 |
| 2020/0101863 | A1* | 4/2020 | Westin | B60L 53/57 |
| 2021/0074094 | A1* | 3/2021 | Schumacher | B60L 53/14 |

FOREIGN PATENT DOCUMENTS

| | | | | |
|---|---|---|---|---|
| CN | 107020973 | A | 8/2017 | |
| CN | 107054143 | A | 8/2017 | |
| CN | 107545628 | A | 1/2018 | |
| CN | 108068637 | A | 5/2018 | |
| CN | 109635976 | A | 4/2019 | |
| CN | 109760547 | A | 5/2019 | |
| CN | 110040022 | A | 7/2019 | |
| CN | 110450661 | A | 11/2019 | |
| EP | 3480051 | A1 | 5/2019 | |
| WO | 2017204798 | A1 | 11/2017 | |
| WO | 2018072613 | A1 | 4/2018 | |
| WO | WO 2019207070 | A1 * | 10/2019 | B60L 53/14 |
| WO | 2019210745 | A1 | 11/2019 | |

* cited by examiner

CHARGING METHOD, APPARATUS, AND SYSTEM

CROSS-REFERENCE TO RELATED APPLICATIONS

This application is a continuation application of International Patent Application No. PCT/CN2020/099210, filed on Jun. 30, 2020, the disclosure of which is hereby incorporated by reference in its entirety.

TECHNICAL FIELD

This application relates to the field of vehicle technologies, and in particular, to a charging method, apparatus, and system.

BACKGROUND

A mobile charging vehicle is a movable vehicle that can provide charging services for electric vehicles. Compared with a fixed charging station or charging pile, the mobile charging vehicle effectively improves charging flexibility of the electric vehicles.

A user may reserve a charging service in a charging service platform, and the charging service platform may schedule, based on the reservation of the user, a mobile charging vehicle to a charging place specified by the user. Before the charging, the user needs to unlock a charging port cover on the vehicle by using a remote control key of a vehicle door. Then, a charging service person may open the charging port cover, and insert a charging gun of the mobile charging vehicle into the charging port, to charge the electric vehicle.

Unlocking of the charging port cover is controlled by the remote control key of the vehicle door. Therefore, in a charging scheduling scenario, after reserving a charging service, the user needs to wait for arrival of the mobile charging vehicle and unlock the charging port cover by using the remote control key. This results in a longer waiting time of the user and lower charging flexibility.

SUMMARY

Embodiments of this application provide a charging method, apparatus, and system, to resolve a problem that in a scheduling charging scenario, a user needs to wait for a mobile charging vehicle to arrive and unlock a charging port cover by using a remote control key, resulting in a long waiting time of the user and relatively low charging flexibility.

According to an aspect, this application provides a charging method, where the method may be applied to an electric vehicle or a mobile terminal. The method includes: A charging reservation interface is displayed, where the charging reservation interface includes a map, and one or more available charging points are displayed on the map. Charging reservation information of the electric vehicle is obtained in response to an operation on the charging reservation interface, where the charging reservation information includes at least a charging location of the electric vehicle, and the charging location is a location of a target charging point in the one or more available charging points. Target unlocking information of a charging port cover of the electric vehicle is obtained. A charging reservation request is generated based on the charging reservation information and the target unlocking information. The charging reservation request is sent to a charging server, where the charging reservation request is used to indicate the charging server to schedule a mobile charging vehicle based on the charging reservation information, and send the target unlocking information to an unlocking device, where the target unlocking information is used by the unlocking device to unlock the charging port cover of the electric vehicle.

In the charging method provided in this application, because the charging server can send the target unlocking information to the unlocking device, when the electric vehicle needs to be charged by using the mobile charging vehicle, the unlocking device may unlock the charging port cover of the electric vehicle based on the target unlocking information. Because a user does not need to unlock the charging port cover by using a remote control key, a waiting time of the user in a charging scheduling scenario can be reduced while security is ensured, thereby improving charging flexibility.

Optionally, the method is applied to the electric vehicle. A process of obtaining the target unlocking information of the charging port cover of the electric vehicle may include that the target unlocking information of the charging port cover of the electric vehicle is generated in response to an unlocking information generation request. Alternatively, the target unlocking information of the charging port cover of the electric vehicle that is sent by the mobile terminal is received. Correspondingly, the method further includes:

An unlocking request sent by the unlocking device is received. The charging port cover is unlocked if the unlocking request meets an unlocking condition, where the unlocking condition includes at least the following condition: Unlocking information carried in the unlocking request matches the target unlocking information.

The electric vehicle directly generates and shares the target unlocking information, so that a quantity of times of exchanging the target unlocking information in a charging reservation process can be reduced, charging reservation efficiency can be improved, and security of the target unlocking information can be ensured.

Optionally, the charging reservation information further includes a valid time period of the target unlocking information, and the unlocking condition further includes the following condition: A moment at which the unlocking request is received is within the valid time period.

The target unlocking information is valid only within the valid time period. Therefore, a security risk caused by leakage of the target unlocking information can be effectively reduced, and security of unlocking the charging port cover can be improved.

Optionally, the method is applied to a mobile terminal. A process of obtaining the target unlocking information of the charging port cover of the electric vehicle may include: An unlocking information generation request is sent to the electric vehicle, and the target unlocking information that is of the charging port cover of the electric vehicle and that is sent by the electric vehicle is received. Alternatively, an unlocking information generation request is sent to a vehicle management server of the electric vehicle, and the target unlocking information that is of the charging port cover of the electric vehicle and that is sent by the vehicle management server is received.

According to the method provided in this application, the mobile terminal may obtain and share the target unlocking information, thereby effectively improving flexibility of charging reservation. Further, because an operation on the mobile terminal is more convenient and more efficient, charging reservation efficiency can be further effectively enhanced, and user experience can be improved.

Optionally, the method is applied to a mobile terminal. A process of obtaining the target unlocking information of the charging port cover of the electric vehicle may include that the target unlocking information of the charging port cover of the electric vehicle is generated in response to a charging reservation instruction. Correspondingly, the method further includes that the target unlocking information is sent to the electric vehicle.

Optionally, the target unlocking information is a randomly generated character string; or the target unlocking information includes an account registered in the vehicle management server of the electric vehicle and a password used to log in to the account.

According to another aspect, a charging method is provided, applied to a mobile charging vehicle. The method includes: Charging reservation information of an electric vehicle and target unlocking information of a charging port cover of the electric vehicle that are sent by a charging server are received, where the charging reservation information includes at least a charging location of the electric vehicle. After the mobile charging vehicle moves to the charging location, an unlocking request is sent to the electric vehicle, where the unlocking request carries the target unlocking information. The electric vehicle is charged after the charging port cover is opened.

According to still another aspect, a charging method is provided, applied to a charging server. The method includes: A charging reservation request is received, where the charging reservation request includes charging reservation information of an electric vehicle and target unlocking information of a charging port cover of the electric vehicle, the charging reservation information includes at least a charging location of the electric vehicle, and the charging location is a location of a target charging point in one or more available charging points displayed on a map of a charging reservation interface. Based on the charging reservation information, a mobile charging vehicle used to charge the electric vehicle is scheduled. The charging location is sent to the mobile charging vehicle. The target unlocking information is sent to an unlocking device, where the target unlocking information is used by the unlocking device to unlock the charging port cover of the electric vehicle.

According to yet another aspect, a charging method is provided, applied to an electric vehicle. The method includes: A charging reservation interface is displayed, where the charging reservation interface includes a map, and one or more available charging points are displayed on the map. Charging reservation information of the electric vehicle is obtained in response to an operation on the charging reservation interface, where the charging reservation information includes at least a charging location of the electric vehicle, and the charging location is a location of a target charging point in the one or more available charging points. Target unlocking information of a charging port cover of the electric vehicle is obtained. A charging reservation request is generated based on the charging reservation information and the target unlocking information. The charging reservation request is sent to a charging server. An unlocking request sent by an unlocking device is received. Unlocking information carried in the unlocking request matches the target unlocking information, and the charging port cover is unlocked.

According to still yet another aspect, a charging method is provided, applied to a vehicle management server. The method includes: An unlocking information generation request sent by a mobile terminal is received, where the unlocking information generation request includes an identifier of an electric vehicle. Target unlocking information of a charging port cover of the electric vehicle is generated. The target unlocking information is sent to the mobile terminal, where the target unlocking information is sent by the mobile terminal to a charging server, and then the target unlocking information is sent to an unlocking device by the charging server. An unlocking request sent by the unlocking device is received, where the unlocking request includes the identifier of the electric vehicle and unlocking information. If the unlocking request meets an unlocking condition, an unlocking instruction is sent to the electric vehicle, where the unlocking instruction is used to instruct to unlock the charging port cover of the electric vehicle, and the unlocking condition at least includes the following condition: Unlocking information carried in the unlocking request matches the target unlocking information.

According to a further aspect, a charging method is provided, applied to a mobile charging vehicle or a mobile terminal. The method includes: Target unlocking information that is of a charging port cover of an electric vehicle and that is sent by a charging server is received. An unlocking request is sent to the electric vehicle, where the unlocking request carries the target unlocking information.

According to a further aspect, a charging apparatus is provided. The apparatus includes at least one module, and the at least one module may be configured to implement the charging method according to any one of the foregoing aspects.

According to a further aspect, a charging apparatus is provided. The apparatus includes: a memory, a processor, and a computer program that is stored on the memory and that can be run on the processor. When the processor executes the computer program, the charging method according to any one of the foregoing aspects is implemented.

According to a further aspect, a computer-readable storage medium is provided. The computer-readable storage medium stores instructions. When the instructions are run on a computer, the computer is enabled to perform the method according to any one of the foregoing aspects.

According to a further aspect, a charging system is provided. The system includes: a charging server, an electric vehicle, and a mobile charging vehicle. The charging server establishes a communication connection to each of the electric vehicle and the mobile charging vehicle.

The charging server may be configured to implement the method that is applied to the charging server and that is provided in the foregoing aspect. The electric vehicle may be configured to implement the method that is applied to the electric vehicle and that is provided in the foregoing aspect. The mobile charging vehicle may be configured to implement the method that is applied to the mobile charging vehicle and that is provided in the foregoing aspect.

According to a further aspect, a charging system is provided. The system includes: a charging server, an electric vehicle, a mobile charging vehicle, and a first mobile terminal. The charging server establishes a communication connection to each of the mobile charging vehicle and the first mobile terminal.

The charging server may be configured to implement the method that is applied to the charging server and that is provided in the foregoing aspect. The electric vehicle may be configured to implement the method that is applied to the electric vehicle and that is provided in the foregoing aspect. The mobile charging vehicle may be configured to implement the method that is applied to the mobile charging vehicle and that is provided in the foregoing aspect. The first mobile terminal may be configured to implement the method that is applied to the mobile terminal and that is provided in the foregoing aspect.

According to a further aspect, a charging system is provided. The system includes: a charging server, an electric vehicle, a mobile charging vehicle, a first mobile terminal, and a vehicle management server. The charging server establishes a communication connection to each of the mobile charging vehicle and the first mobile terminal, and the vehicle management server establishes a communication connection to each of the electric vehicle and the first mobile terminal.

The charging server may be configured to implement the method that is applied to the charging server and that is provided in the foregoing aspect. The electric vehicle may be configured to implement the method that is applied to the electric vehicle and that is provided in the foregoing aspect. The mobile charging vehicle may be configured to implement the method that is applied to the mobile charging vehicle and that is provided in the foregoing aspect. The first mobile terminal may be configured to implement the method that is applied to the mobile terminal and that is provided in the foregoing aspect. The vehicle management server may be configured to implement the method that is applied to the vehicle management server and that is provided in the foregoing aspect.

According to a further aspect, a charging system is provided. The system includes: a charging server, an electric vehicle, a mobile charging vehicle, and a second mobile terminal. The charging server establishes a communication connection to each of the mobile charging vehicle and the second mobile terminal.

The charging server may be configured to implement the method that is applied to the charging server and that is provided in the foregoing aspect. The electric vehicle may be configured to implement the method that is applied to the electric vehicle and that is provided in the foregoing aspect. The mobile charging vehicle may be configured to implement the method that is applied to the mobile charging vehicle and that is provided in the foregoing aspect. The second mobile terminal may be configured to implement the method that is applied to the mobile terminal and that is provided in the foregoing aspect.

The technical solution provided in this application at least includes the following beneficial effects:

Embodiments of this application provide a charging method, apparatus, and system. An electric vehicle may generate target unlocking information of a charging port cover of the electric vehicle, and the target unlocking information may be carried in a charging reservation request sent to a charging server. After receiving the charging reservation request, the charging server may send the target unlocking information to a mobile charging vehicle. The mobile charging vehicle may unlock the charging port cover of the electric vehicle based on the target unlocking information when the electric vehicle needs to be charged. Because a user does not need to unlock the charging port cover by using a remote control key, a waiting time of the user in a charging scheduling scenario can be reduced while security is ensured, thereby improving charging flexibility.

DESCRIPTION OF EMBODIMENTS

To make the objectives, technical solutions, and advantages of this application clearer, the following further describes the implementations of this application in detail with reference to the accompanying drawings.

Figure 1:
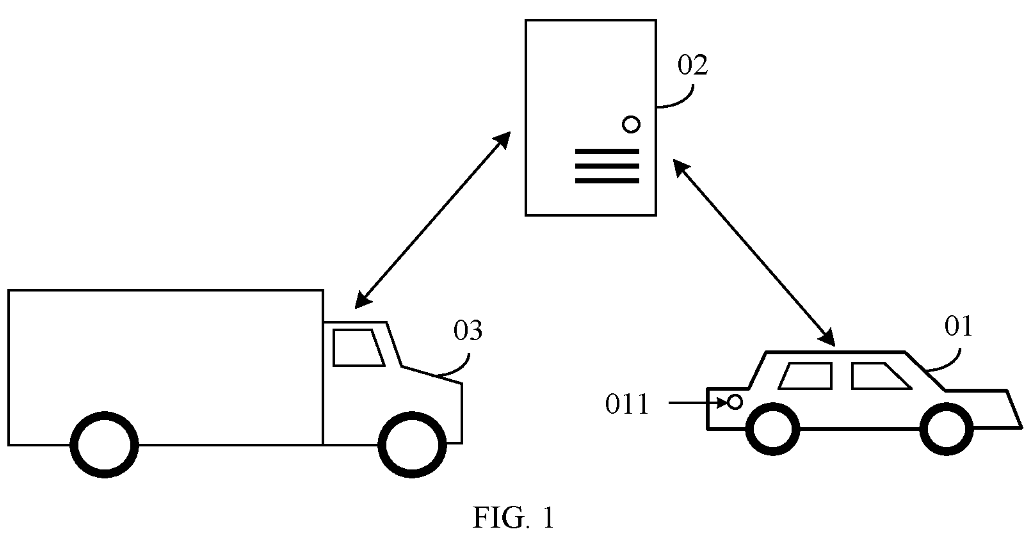
FIG. 1 is a schematic diagram of a structure of a charging system according to an embodiment of this application.

FIG. 1 is a schematic diagram of a charging system according to an embodiment of this application. As shown in FIG. 1, the charging system includes an electric vehicle 01, a charging server 02, and a mobile charging vehicle 03. Both the electric vehicle 01 and the mobile charging vehicle 03 establish a communication connection to the charging server 02.

The electric vehicle 01 is a vehicle that can drive a wheel to travel by using electric energy provided by an in-vehicle power supply as power. A charging port is disposed on a vehicle body of the electric vehicle 01, and the in-vehicle power supply in the electric vehicle 01 can be charged by inserting a charging gun into the charging port. In addition, to protect the charging port, as shown in FIG. 1, a charging port cover 011 is further disposed on the vehicle body of the electric vehicle 01. Unlocking and locking of the charging port cover 011 may be controlled by a remote control key of a vehicle door. That is, when the vehicle door is unlocked, the charging port cover 011 may be unlocked; and when the vehicle door is locked, the charging port cover 011 is locked. In this embodiment of this application, the electric vehicle 01 may include a vehicle that is driven by electricity and that is provided with a charging port and a charging port cover, such as an electric vehicle, an electric truck, an electric tricycle, an electric motorcycle, and an electric bicycle.

The mobile charging vehicle 03 is a vehicle that can move and that can provide a charging service for the electric vehicle 01 by using energy storage carried by the mobile charging vehicle 03 or by moving energy storage. In addition, the mobile charging vehicle 03 may move by manual driving, or may move by automatic driving.

The charging server 02 may be a server, or may be a server cluster including several servers, or may be a cloud computing center. The charging server 02 is configured to provide a charging reservation service for a user of the electric vehicle 01, centrally manage and schedule the mobile charging vehicle 03, and provide a dispatching service (for example, manage and schedule a charging service person) for a charging service person (which may also be referred to as a maintenance person or an operation and maintenance person). The charging server 02 may also be referred to as a charging service cloud.

A process of reserving a charging service by a user is as follows: First, the user sends, to the charging server 02 by using a charging reservation client in a mobile terminal of the user or an in-vehicle charging reservation client in an electric vehicle 01, a charging request that carries charging reservation information. The charging reservation information may include a charging location and a charging time period that are selected by the user. After receiving the charging request, the charging server 02 may schedule the mobile charging vehicle 03 to move to the charging location in the charging time period selected by the user, to charge the electric vehicle 01.

In a related technology, unlocking and locking of the charging port cover 011 are both controlled by a remote control key. Therefore, after sending a charging request by using a charging reservation client, a user needs to wait for the mobile charging vehicle 03 to arrive at the charging location, and then unlock the charging port cover 011 by using the remote control key. This results in longer waiting time for a user, higher time costs, and less charging flexibility. Alternatively, after sending the charging request by using the charging reservation client, the user may unlock the charging port cover 011 in advance by using the remote control key. In this way, although the user does not need to wait in place, because the charging port cover 011 is unlocked in advance, there is a security risk to some extent.

An embodiment of this application provides a charging method. In the method, target unlocking information of a charging port cover of an electric vehicle may be obtained in advance, and the target unlocking information may be carried in a charging reservation request sent to a charging server. After receiving the charging reservation request, the charging server may share the target unlocking information with an unlocking device. The unlocking device may then unlock the charging port cover of the electric vehicle when the mobile charging vehicle needs to charge the electric vehicle. Because the user does not need to perform unlocking by using the remote control key, a waiting time of the user in a charging scheduling scenario can be reduced while security is ensured, thereby improving charging flexibility.

The target unlocking information may be generated by the electric vehicle, or may be generated by a first mobile terminal of the user, or may be generated by a vehicle management server (which may also be referred to as a vehicle cloud platform) of the electric vehicle. The charging reservation request may be sent by the electric vehicle or the first mobile terminal of the user. The unlocking device may be the mobile charging vehicle, or may be a second mobile terminal of a charging service person.

Figure 2:
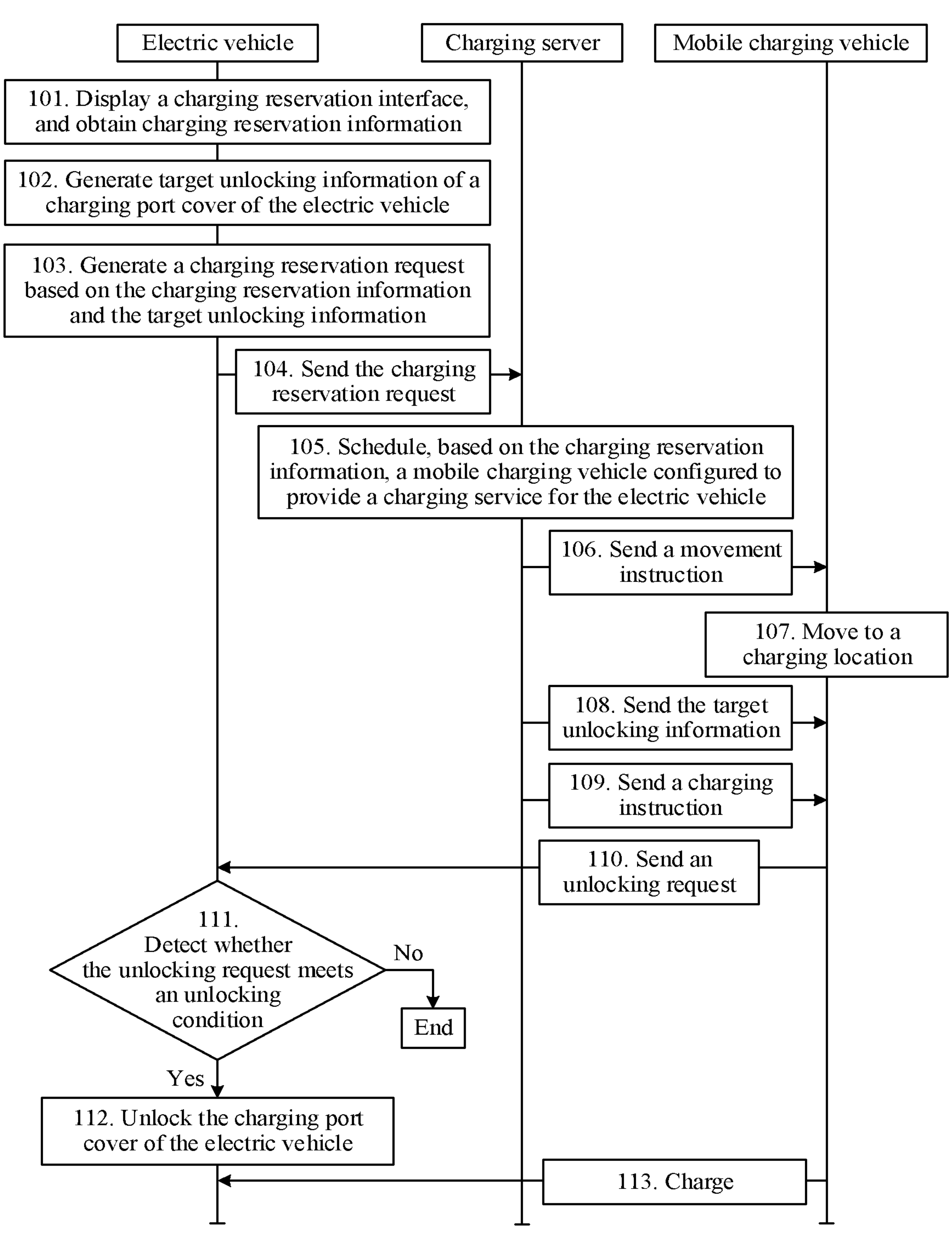
FIG. 2 is a flowchart of a charging method according to an embodiment of this application.

FIG. 2 is a flowchart of a charging method according to an embodiment of this application. The charging method is described by using an example in which an electric vehicle generates target unlocking information and sends a charging reservation request, and the unlocking device is a mobile charging vehicle. The charging method may be applied to the system shown in FIG. 1. Refer to FIG. 2. The charging method includes the following steps.

Step 101. The electric vehicle displays a charging reservation interface, and obtains charging reservation information.

Figure 3:
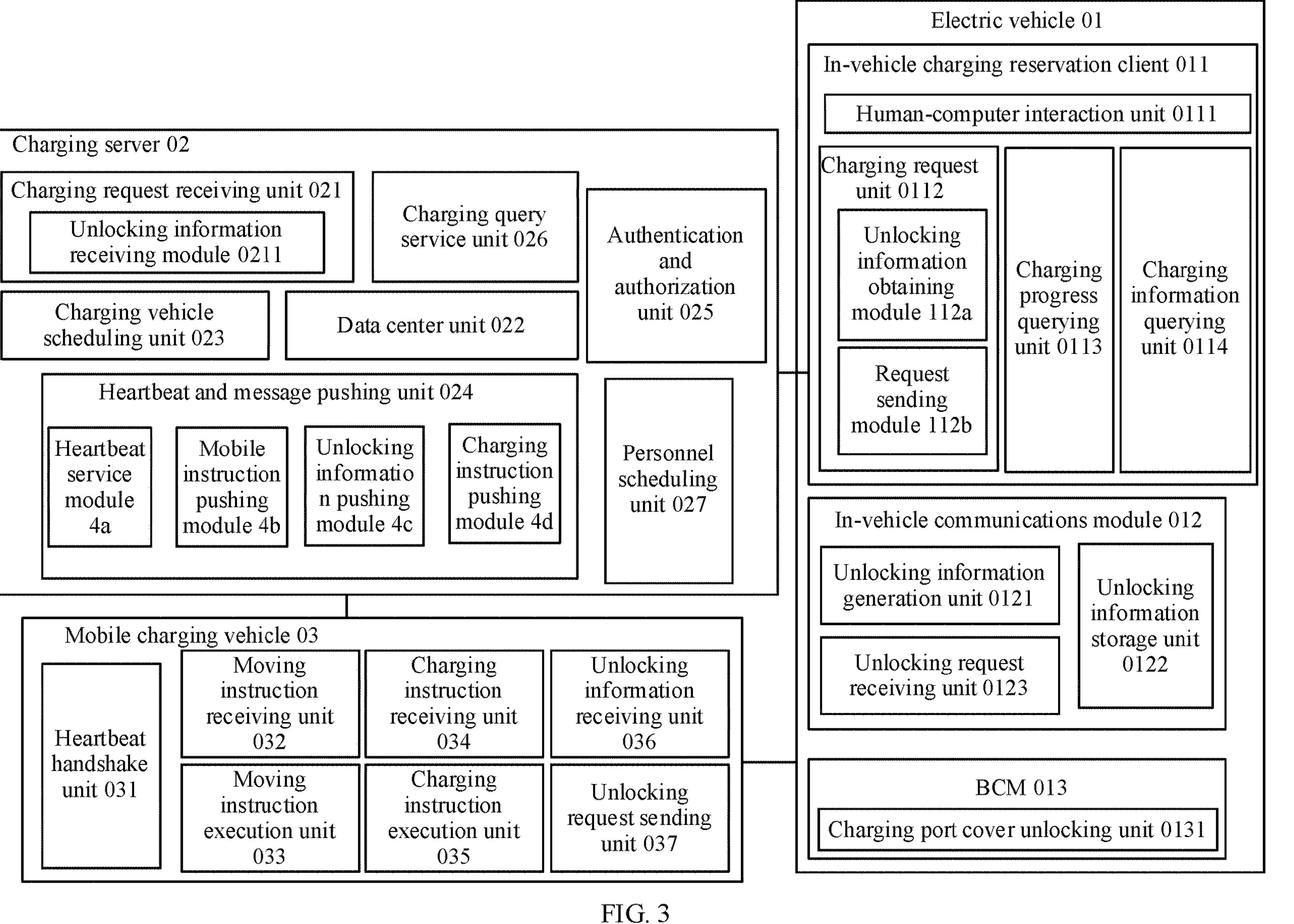
FIG. 3 is a schematic diagram of another charging system according to an embodiment of this application.

In this embodiment of this application, as shown in FIG. 3, an in-vehicle charging reservation client 011 is installed in the electric vehicle 01. For example, the in-vehicle charging reservation client 011 may be installed in a cockpit domain controller (CDC) of the electric vehicle 01. The in-vehicle charging reservation client 011 has a human-computer interaction unit 0111. The human-computer interaction unit 0111 can display the charging reservation interface in response to a charging reservation instruction triggered by a user. Then, the user may enter or select the charging reservation information in the charging reservation interface, and the in-vehicle charging reservation client 011 obtains the charging reservation information entered or selected by the user. The charging reservation information includes at least a charging location. The charging reservation information may further include one or more of a charging time period, vehicle information, and charging requirement information. The vehicle information is information used to reflect a feature of the electric vehicle, for example, may include one or more pieces of information such as a model, a license plate, and a color of the electric vehicle. The charging requirement information is information used to indicate charging energy required by the electric vehicle, for example, may include a charging degree, a charging percentage, or a charging amount.

Optionally, the charging reservation interface includes a map near the current location of the electric vehicle, and the map may display a location of a mobile charging vehicle near the current location of the electric vehicle. The user can click a charging location on a map or directly enter a charging location. If the user does not select or enter a charging location on the charging reservation interface, the in-vehicle charging reservation client 011 may directly determine a current location of the electric vehicle as the charging location.

Figure 4:
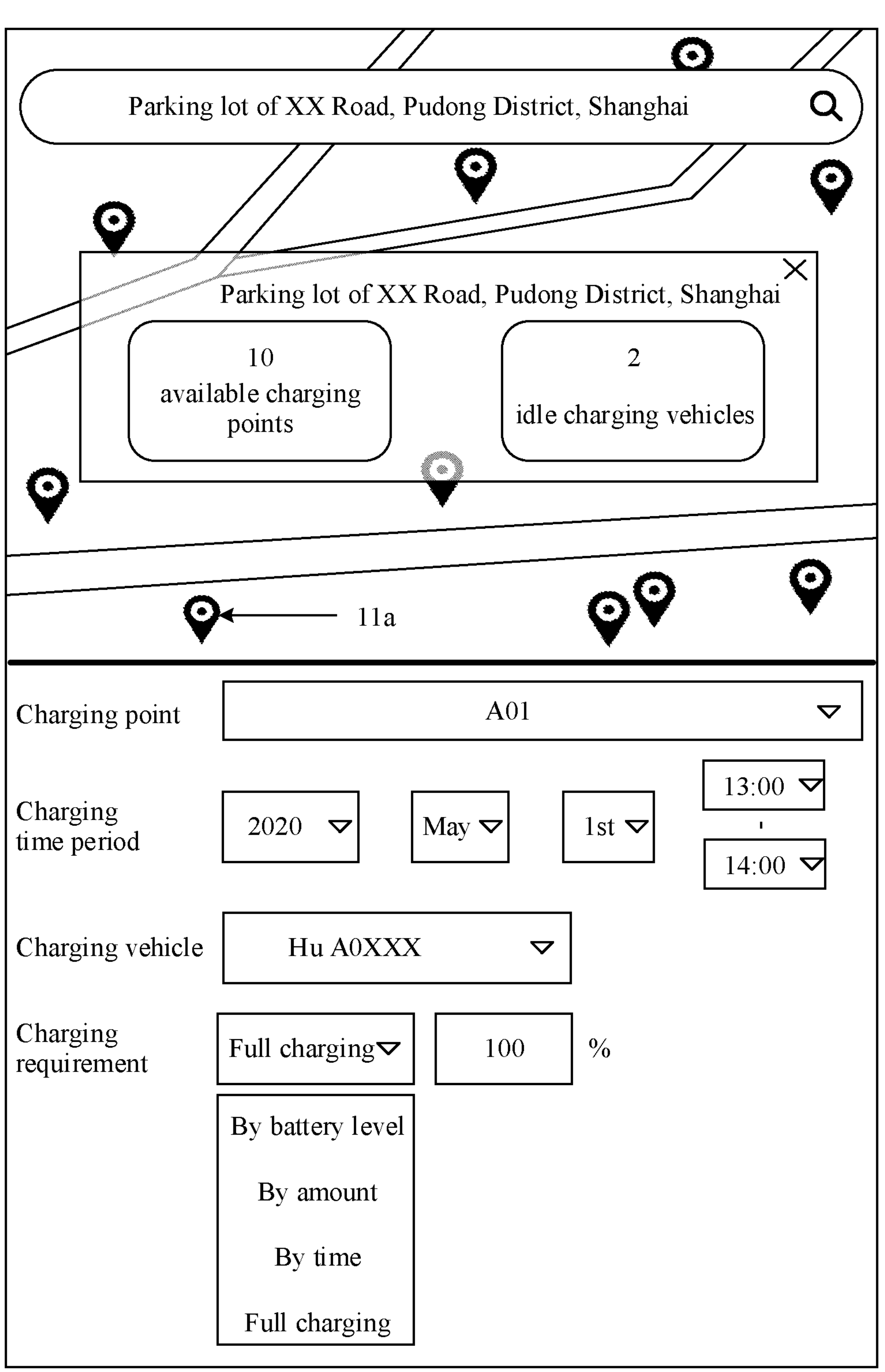
FIG. 4 is a schematic diagram of a charging reservation interface according to an embodiment of this application.

Because of a relatively large volume, the mobile charging vehicle needs relatively large space. Therefore, to ensure that the charging location selected by the user has sufficient space, as shown in FIG. 4, the map of the charging reservation interface may further display one or more nearby available charging points 11*a*. The user may select a target available charging point as the charging location of the electric vehicle. In other words, the electric vehicle may determine a location of the target available charging point as the charging location of the electric vehicle in response to a selection operation performed by the user on the target available charging point in the one or more available charging points on the map.

Optionally, refer to FIG. 4. The charging reservation interface may further display an input box or an option list of each of the charging time period, the vehicle information, and the charging requirement information. For example, as shown in FIG. 4, the charging reservation interface may display an input box of the license plate of the electric vehicle and an option list and an input box of a charging requirement. The option list of the charging requirement may include options of a plurality of charging manners such as charging by power, charging by amount, charging by time, and full charging. The user may directly enter corresponding information in the input box, or may select corresponding information from the option list. In other words, the electric vehicle may determine a charging time period, vehicle information, charging requirement information, and the like of the electric vehicle in response to an input or a selection operation of the user. Optionally, as shown in FIG. 4, the charging reservation interface may further display a quantity of nearby mobile charging vehicles and a quantity of idle charging vehicles (for example, mobile charging vehicles that can be scheduled). Optionally, the charging reservation interface may further display a historical charging task of the electric vehicle and a progress of a current charging task.

In this embodiment of this application, content displayed in the charging reservation interface is obtained by the in-vehicle charging reservation client 011 from the charging server 02. Each available charging point 11*a* is an area that is determined by the charging server 02 in advance and that can park at least one mobile charging vehicle and one electric vehicle. In addition, a location of each available charging point 11*a* may be described by using a longitude, a latitude, and an altitude, or may be described by using a map number, a longitude, and a latitude.

For example, as shown in FIG. 4, it is assumed that a current location of the electric vehicle is “a parking lot on XX Road, Pudong District, Shanghai”, and ten nearby available charging points 11*a* are displayed on the map of the charging reservation interface, where numbers of the ten available charging points 11*a* are A01 to A10. It is assumed that the user selects an available charging point numbered A01 in the charging reservation interface, a selected charging time period is 13:00 to 14:00 on May 1, 2020, a selected license plate of the electric vehicle is Shanghai A0XXX, and a selected charging requirement is full charging. In this case, a charging location in charging reservation information obtained by the in-vehicle charging reservation client 011 of the electric vehicle 01 is a location of the available charging point numbered A01, the charging time period is 13:00 to 14:00 on May 1, 2020, the vehicle information is Shanghai A0XXX, and the charging requirement information is full charging.

Step 102. The electric vehicle generates target unlocking information of the charging port cover of the electric vehicle.

In this embodiment of this application, after obtaining the charging reservation information, the electric vehicle may directly generate the target unlocking information of the charging port cover of the electric vehicle. Alternatively, the charging reservation interface may further display an unlocking information trigger control. After the in-vehicle charging reservation client 011 detects a selection operation performed by the user on the unlocking information trigger control, the electric vehicle generates the target unlocking information of the charging port cover of the electric vehicle. In other words, the electric vehicle may generate the target unlocking information of the charging port cover after receiving an instruction of the user, to ensure security of generating and sharing the target unlocking information of the charging port cover.

Optionally, the electric vehicle may randomly generate a character string as the target unlocking information. Alternatively, the electric vehicle may use an account and a password that are registered by the electric vehicle in a vehicle management server as the target unlocking information. Alternatively, the electric vehicle may further obtain information entered by the user on a human-computer interaction interface (for example, a charging reservation interface displayed on the human-computer interaction interface) of the electric vehicle as the target unlocking information.

In this embodiment of this application, to ensure security of unlocking the charging port cover, the charging reservation information obtained by the electric vehicle may further include a valid time period of the target unlocking information selected or entered by the user on the charging reservation interface. If the user does not select or enter the valid time period, the electric vehicle may further use a preconfigured default time period as the valid time period. The default time period may be configured during development of an in-vehicle charging reservation client in the electric vehicle, or may be preconfigured by a user. For example, the default time period may be a time period 24 hours from a current moment, that is, valid duration of the target unlocking information is one day.

For example, as shown in FIG. 3, the in-vehicle charging reservation client 011 further includes a charging request unit 0112, and the charging request unit includes an unlocking information obtaining module 112*a*. The electric vehicle 01 further includes an in-vehicle communications module (telematics box (T-BOX)) 012, and the in-vehicle communications module 012 includes an unlocking information generation unit 0121 and an unlocking information storage unit 0122. After detecting a tap operation performed by the user on the unlocking information trigger control and obtaining a valid time period, the human-computer interaction unit 0111 of the in-vehicle charging reservation client 011 may send, to the charging request unit 0112, an unlocking information obtaining instruction carrying the valid time period. The unlocking information obtaining module 112*a* in the charging request unit 0112 may forward the unlocking information obtaining instruction to the unlocking information generation unit 0121. The unlocking information generation unit 0121 may generate the target unlocking information of the charging port cover in response to the unlocking information obtaining instruction. Then, the unlocking information generation unit 0121 may separately send the generated target unlocking information to the unlocking information obtaining module 112*a* and the unlocking information storage unit 0122. In addition, the unlocking information generation unit 0121 may further send the valid time period to the unlocking information storage unit 0122. The unlocking information storage unit 0122 is configured to store the target unlocking information and the valid period of the target unlocking information.

Step 103. The electric vehicle generates a charging reservation request based on the charging reservation information and the target unlocking information.

Optionally, refer to FIG. 3. After receiving the target unlocking information sent by the unlocking information generation unit 0121, the unlocking information obtaining module 112*a* may send the target unlocking information to a request sending module 112*b*. The human-computer interaction unit 0111 may further send the obtained charging reservation information to the request sending module 112*b*. The request sending module 112*b* may further generate the charging reservation request based on the obtained charging reservation information and the target unlocking information.

Step 104. The electric vehicle sends the charging reservation request to the charging server.

As shown in FIG. 3, the request sending module 112*b* of the in-vehicle charging reservation client 011 may send the charging reservation request to the charging server 02.

Step 105. The charging server schedules, based on the charging reservation information, a mobile charging vehicle configured to provide a charging service for the electric vehicle.

In this embodiment of this application, the charging server stores information about each mobile charging vehicle managed by the charging server. The information about each mobile charging vehicle may include an identifier (for example, a license plate), a location, a status, a total charging capacity, a remaining available charging capacity, a charging function indicator, and the like of the mobile charging vehicle. The charging function indicator is used to indicate whether the mobile charging vehicle supports fast charging or slow charging, and a maximum current, a maximum voltage, and the like that are supported by the mobile charging vehicle. After receiving the charging reservation request sent by the electric vehicle, the charging server may determine, based on the charging reservation information, the mobile charging vehicle configured to provide the charging service for the electric vehicle from the plurality of mobile charging vehicles. A status of the mobile charging vehicle may include an idle state, a charging state (for example, the mobile charging vehicle is performing self-charging), a working state (for example, the mobile charging vehicle is providing a charging service for the electric vehicle), a fault state, a maintenance state, and the like.

Optionally, the charging server may select, based on a status and a remaining available charging capacity of each mobile charging vehicle, a mobile charging vehicle that is in an idle state and that can meet the charging requirement of the electric vehicle from the plurality of mobile charging vehicles. Then, the charging server may determine, as a mobile charging vehicle configured to provide the charging service for the electric vehicle, a mobile charging vehicle closest to the charging location of the electric vehicle in mobile charging vehicles that are obtained through screening.

For example, as shown in FIG. 3, the charging server 02 includes a charging request receiving unit 021, a data center unit 022, a charging vehicle scheduling unit 023, and a heartbeat and message pushing unit 024. The charging request receiving unit 021 is configured to receive a charging reservation request. In addition, the charging request receiving unit 021 includes an unlocking information receiving module 0211 configured to receive unlocking information. The charging request receiving unit 021 may store a received charging reservation request in the data center unit 022, and send the received charging reservation request to the charging vehicle scheduling unit 023. The data center unit 022 is configured to store or cache information related to charging reservation, for example, information about a mobile charging vehicle 03, information about a registered user, information about a charging service person, information about an available charging point, information about a self-charging point, a charging reservation request, and map data. The self-charging point is a place used to supplement energy for the mobile charging vehicle 03. After receiving the charging reservation request, the charging vehicle scheduling unit 023 may determine, based on the information about the mobile charging vehicle 03 stored in the data center unit 022, the mobile charging vehicle 03 configured to provide the charging service for the electric vehicle, that is, determine the to-be-scheduled mobile charging vehicle 03.

The heartbeat and message pushing unit 024 is configured to receive data reported by the mobile charging vehicle 03, and push data to the mobile charging vehicle 03. As shown in FIG. 3, the heartbeat and message pushing unit 024 includes a heartbeat service module 4*a*. The mobile charging vehicle 03 includes a heartbeat handshake unit 031. The heartbeat handshake unit 031 may establish a communication connection to the heartbeat service module 4*a*, and may report data to the heartbeat service module 4*a*. The heartbeat service module 4*a* is configured to receive data reported by the mobile charging vehicle 03, and send and store the reported data to the data center unit 022. For example, the heartbeat handshake unit 031 may periodically report data to the heartbeat service module 4*a*, or the heartbeat handshake unit 031 may report data to the heartbeat service module 4*a* after detecting that related data (for example, a location and a status) of the mobile charging vehicle changes. The data reported by the mobile charging vehicle 03 may include a location, a status, fault data, charging process data, charging result data, a heartbeat handshake message, and the like of the mobile charging vehicle. The heartbeat handshake message refers to a message used to maintain a long connection between the heartbeat service module 4*a* and the heartbeat handshake unit 031.

Optionally, to ensure security of the provided charging reservation service, as shown in FIG. 3, the charging server 02 further includes an authentication unit 025. The authentication unit 025 may perform authentication and authorization on an account logged in to the in-vehicle charging reservation client 011 that sends the charging reservation request. In an example, the user can reserve the charging service only after registering an account in the charging server 02 by using the in-vehicle charging reservation client 011 and logging in to the charging server 02.

Step 106. The charging server sends a movement instruction to the mobile charging vehicle.

After determining the mobile charging vehicle configured to provide the charging service, the charging server may send the movement instruction to the mobile charging vehicle. The movement instruction includes at least the charging location of the electric vehicle. Optionally, the movement instruction may further include one or more of the charging time period, the vehicle information, and the charging requirement information.

Refer to FIG. 3. The heartbeat and message pushing unit 024 of the charging server 01 further includes a movement instruction pushing module 4*b*, and the movement instruction pushing module 4*b* is configured to push the movement instruction to the mobile charging vehicle. The mobile charging vehicle 03 further includes a movement instruction receiving unit 032. The movement instruction receiving unit 032 is configured to receive the movement instruction sent by the movement instruction pushing module 4*b*.

For example, it is assumed that the movement instruction includes the charging location (a location of an available charging point numbered) A01, and the charging time period (13:00 to 14:00 on May 1, 2020). The mobile charging vehicle may move to the available charging point numbered A01 from 13:00 to 14:00 on May 1, 2020.

Step 107. The mobile charging vehicle moves to the charging location.

After receiving the movement instruction that carries the charging location and that is sent by the charging server, the mobile charging vehicle may move to the charging location in response to the movement instruction. In an optional implementation, after obtaining the charging location in the movement instruction, the mobile charging vehicle may automatically drive to the charging location. In another optional implementation, after receiving the movement instruction, the mobile charging vehicle may display the charging location on a human-computer interaction interface of the mobile charging vehicle, or may display a navigation route of driving from a current location to the charging location. Then, a driver (for example, a charging service person) may drive the mobile charging vehicle to the charging location.

For example, refer to FIG. 3. The mobile charging vehicle 03 further includes a movement instruction execution unit 033. The movement instruction execution unit 033 is configured to execute the movement instruction received by the movement instruction receiving unit 032, that is, control the mobile charging vehicle 03 to automatically drive to the charging location. For example, the mobile charging vehicle 03 may automatically drive to the available charging point numbered A01 from 13:00 to 14:00 on May 1, 2020 by using the movement instruction execution unit 033.

Step 108. The charging server sends the target unlocking information to the mobile charging vehicle.

For example, refer to FIG. 3. The heartbeat and message pushing unit 024 of the charging server 01 further includes an unlocking information pushing module 4*c*. The unlocking information pushing module 4*c* is configured to push the target unlocking information of the charging port cover of the electric vehicle to the mobile charging vehicle 03.

Step 109. The charging server sends a charging instruction to the mobile charging vehicle.

In this embodiment of this application, after detecting that the mobile charging vehicle moves to the charging location, the charging server may send the charging instruction to the mobile charging vehicle. The charging instruction may include one or more of the charging time period, the vehicle information, and the charging requirement information. In an example, if the movement instruction sent by the charging server already includes the foregoing information, the charging instruction may not need to carry the foregoing information, that is, the charging instruction is only used to instruct the mobile charging vehicle to start to provide the charging service.

Optionally, the charging server may determine, based on a location periodically reported by the mobile charging vehicle, whether the mobile charging vehicle has moved to the charging location. Alternatively, after moving to the charging location, the mobile charging vehicle may send prompt information to the charging server, and the charging server may determine, based on the prompt information, that the mobile charging vehicle has moved to the charging location.

In this embodiment of this application, the charging instruction may alternatively be sent to the mobile charging vehicle by a charging service client installed in the second mobile terminal of the charging service person. Alternatively, the charging service person may directly trigger the charging instruction in a human-computer interaction unit of the mobile charging vehicle.

For example, refer to FIG. 3. The heartbeat and message pushing unit 024 of the charging server 01 further includes a charging instruction pushing module 4*d*. The charging instruction pushing module 4*d* is configured to push the charging instruction to the mobile charging vehicle 03.

Step 110. The mobile charging vehicle sends an unlocking request to the electric vehicle.

After receiving the charging instruction, the mobile charging vehicle may send, to the electric vehicle, the unlocking request carrying the target unlocking information, to unlock the charging port cover of the electric vehicle.

For example, refer to FIG. 3. The mobile charging vehicle 03 further includes a charging instruction receiving unit 034, a charging instruction execution unit 035, an unlocking information receiving unit 036, and an unlocking request sending unit 037. The charging instruction receiving unit 034 is configured to receive the charging instruction, and forward the charging instruction to the charging instruction execution unit 035. The charging instruction execution unit 035 is configured to execute the charging instruction. The unlocking information receiving unit 036 is configured to: receive the unlocking information of the electric vehicle, and send the unlocking information to the unlocking request sending unit 037. The unlocking request sending unit 037 is configured to send the unlocking request. The unlocking request sending unit 037 may include a radio signal transmitter, and the radio signal transmitter can send the unlocking request in a form of a radio wave.

Step 111. The electric vehicle detects whether the unlocking request meets an unlocking condition.

If the unlocking request meets the unlocking condition, the electric vehicle performs step 112. If the unlocking request does not meet the unlocking condition, the electric vehicle may end the operation, that is, the electric vehicle may keep the charging port cover in a locked state. The unlocking condition includes at least the following condition. The unlocking information carried in the unlocking request matches the target unlocking information pre-generated and stored by the electric vehicle.

Optionally, if the electric vehicle further stores the valid time period of the target unlocking information, the unlocking condition further includes the following condition: A moment at which the unlocking request is received is within the valid time period. Correspondingly, if unlocking information carried in the unlocking request matches the target unlocking information, and a moment at which the unlocking request is received is within the valid time period, the electric vehicle may determine that the unlocking request meets the unlocking condition, and may perform step 112. If the unlocking information carried in the unlocking request does not match the target unlocking information, or the unlocking information matches the target unlocking information, but a moment at which the unlocking request is received is not within the valid time period, the electric vehicle may determine that the unlocking request does not meet the unlocking condition, and therefore may end the operation. The target unlocking information is valid only within the valid time period. Therefore, a security risk caused by leakage of the target unlocking information can be effectively reduced, and security of unlocking the charging port cover can be improved.

Refer to FIG. 3. The in-vehicle communications module 012 of the electric vehicle 01 further includes an unlocking request receiving unit 0123. The unlocking request receiving unit 0123 is configured to receive the unlocking request, detect whether the unlocking information carried in the unlocking request matches the target unlocking information stored in the unlocking information storage unit 0122, and detect whether a moment at which the unlocking request is received is within the valid time period stored in the unlocking information storage unit 0122. That is, the unlocking request receiving unit 0123 may detect whether the unlocking request meets the unlocking condition, so that authentication can be performed on the unlocking request.

For example, it is assumed that the target unlocking information stored in the electric vehicle is 0011, and the valid time period is 13:00 to 15:00 on May 1, 2020. If the electric vehicle receives the unlocking request at 13:30 on May 1, 2020, and the unlocking information carried in the unlocking request is 0011, the electric vehicle may determine that the unlocking request meets the unlocking condition, that is, the authentication succeeds, and step 112 may be performed.

Step 112. The electric vehicle unlocks the charging port cover of the electric vehicle.

If the electric vehicle determines that the unlocking request received by the electric vehicle meets the unlocking condition, the electric vehicle may unlock the charging port cover of the electric vehicle.

For example, refer to FIG. 3. The electric vehicle 01 further includes a body control module (BCM) 013, and the BCM 013 includes a charging port cover unlocking unit 0131. After detecting that the unlocking request meets the unlocking condition, the unlocking request receiving unit 0123 in the in-vehicle communications module 012 may indicate, by using a vehicle control unit (VCU), the charging port cover unlocking unit 0131 of the BCM 013 to unlock the charging port cover.

Step 113. The mobile charging vehicle charges the electric vehicle.

In this embodiment of this application, after the electric vehicle unlocks the charging port cover of the electric vehicle, a charging plug of the mobile charging vehicle may be inserted into the charging port of the electric vehicle, and start to charge the electric vehicle. If the movement instruction or the charging instruction received by the mobile charging vehicle further carries the charging requirement information, the mobile charging vehicle may charge the electric vehicle based on the charging requirement information. For example, if the charging requirement information is a quantity of charging degrees X, the mobile charging vehicle may charge the electric vehicle with X degrees of electricity. After the charging is complete, the charging gun is removed and the charging port cover is closed to complete the reserved charging service.

Optionally, the mobile charging vehicle further includes a mechanical arm. The mobile charging vehicle may open or close the charging port cover by using the mechanical arm, and may insert the charging gun into or remove the charging gun from the charging port of the electric vehicle by using the mechanical arm. Alternatively, a charging service person accompanying the mobile charging vehicle may open or close the charging port cover, and insert or remove the charging gun of the mobile charging vehicle into or from the charging port of the electric vehicle.

In this embodiment of this application, as shown in FIG. 3, the in-vehicle charging reservation client 011 installed in the electric vehicle 01 further includes a charging progress query unit 0113 and a charging information query unit 0114. The charging server 02 further includes a charging query service unit 026. The charging progress query unit 0113 is configured to send a charging progress query request to the charging query service unit 026. The charging query service unit 026 may send, in response to the charging progress query request, a progress of a currently ongoing charging service to the charging progress query unit 0113. The charging information query unit 0114 is configured to send a charging information query request to the charging query service unit 026. The charging query service unit 026 may send, in response to the charging information query request, related information of a completed historical charging task to the charging progress query unit 0113.

It should be noted that a sequence of the steps of the charging method provided in this embodiment of this application may be properly adjusted, and a step may be added or removed based on a situation. For example, step 108 may be performed before step 107. For example, step 108 may be performed synchronously with step 106. Alternatively, step 108 may be deleted based on a situation. In an example, the charging server may send the movement instruction or the charging instruction that includes the target unlocking information. Alternatively, step 109 may be deleted based on a situation. In an example, after moving to the charging location, the mobile charging vehicle may directly send an unlocking request to the electric vehicle without waiting for the charging instruction sent by the charging server. Alternatively, step 109 may be performed after step 110. In an example, the charging server may send the charging instruction to the mobile charging vehicle after determining that the charging port cover of the electric vehicle is unlocked. Any variation method readily figured out by a person skilled in the art within the technical scope disclosed in this application shall fall within the protection scope of this application. Therefore, details are not described herein.

In conclusion, this embodiment of this application provides a charging method. An electric vehicle may generate target unlocking information of a charging port cover of the electric vehicle, and the target unlocking information may be carried in a charging reservation request sent to a charging server. After receiving the charging reservation request, the charging server may send the target unlocking information to a mobile charging vehicle. The mobile charging vehicle may unlock the charging port cover of the electric vehicle based on the target unlocking information when the electric vehicle needs to be charged. Because a user does not need to unlock the charging port cover by using a remote control key, a waiting time of the user in a charging scheduling scenario can be reduced while security is ensured, thereby improving charging flexibility.

In addition, in the solution provided in this embodiment of this application, the electric vehicle directly generates and shares the target unlocking information, so that a quantity of times of exchanging the target unlocking information in the system can be reduced, charging reservation efficiency can be improved, and security of the target unlocking information can be ensured.

Figures 5, 6:
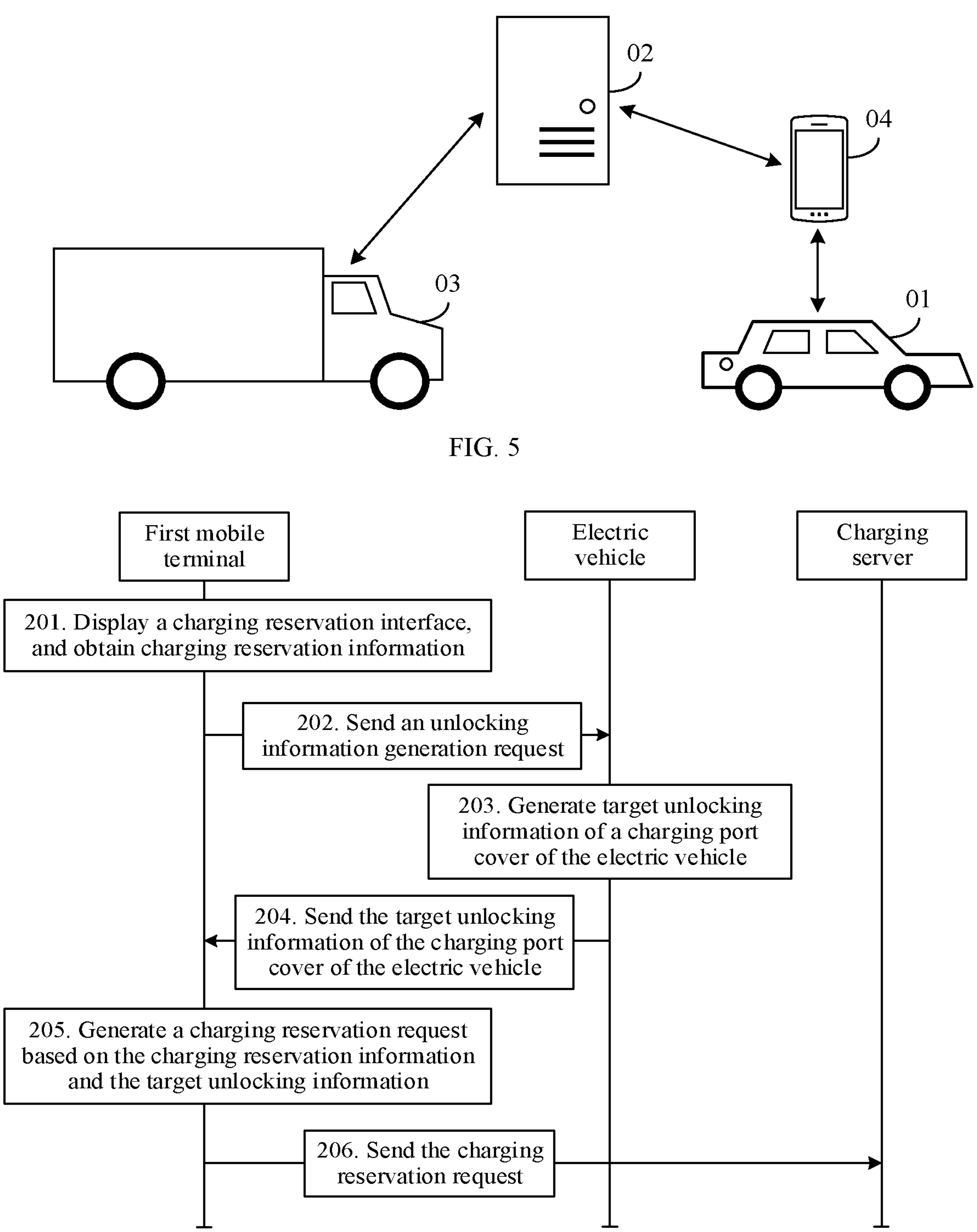
FIG. 5 is a schematic diagram of a structure of still another charging system according to an embodiment of this application.
FIG. 6 is a flowchart of another charging method according to an embodiment of this application.

FIG. 5 is a schematic diagram of a structure of another charging system according to an embodiment of this application. As shown in FIG. 5, in addition to an electric vehicle 01, a charging server 02, and a mobile charging vehicle 03, the system further includes a first mobile terminal 04. The first mobile terminal 04 is a mobile terminal of a user of the electric vehicle 01, and the first mobile terminal 04 may be an intelligent device such as a smartphone, a tablet computer, or a wearable device. Both the first mobile terminal 04 and the mobile charging vehicle 03 establish a communication connection to the charging server 02, and the first mobile terminal 04 further establishes a communication connection to the electric vehicle 01.

FIG. 6 is a flowchart of another charging method according to an embodiment of this application. The charging method is described by using an example in which the electric vehicle 01 generates target unlocking information, the first mobile terminal 04 of a user sends a charging reservation request, and an unlocking device is the mobile charging vehicle 03. The charging method may be applied to the system shown in FIG. 5. Refer to FIG. 6. The charging method includes the following steps.

Step 201. A first mobile terminal displays a charging reservation interface, and obtains charging reservation information.

Figure 7:
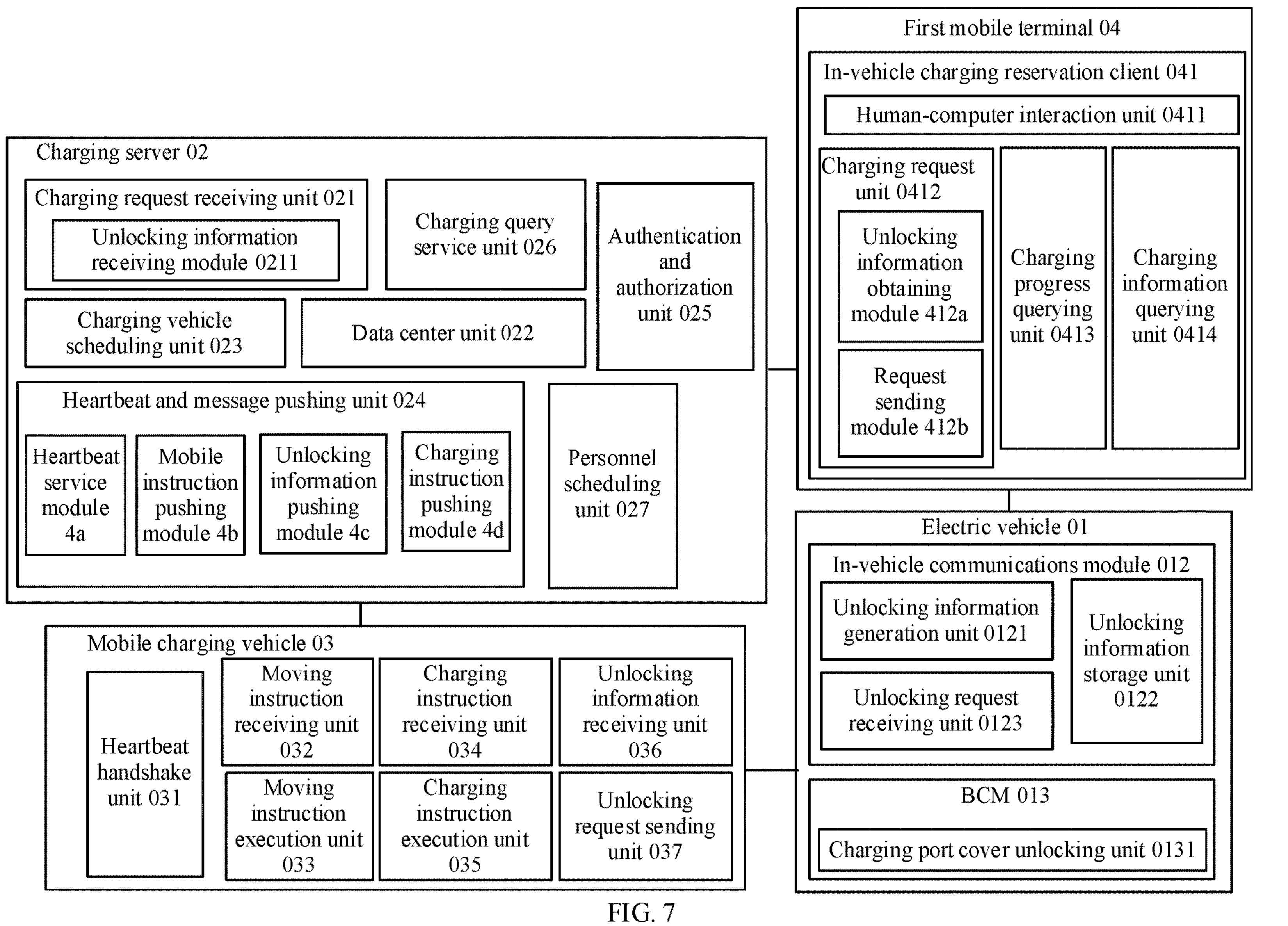
FIG. 7 is a schematic diagram of a structure of yet another charging system according to an embodiment of this application.

In this embodiment of this application, as shown in FIG. 7, an in-vehicle charging reservation client 041 is installed in the first mobile terminal 04. For example, the in-vehicle charging reservation client 041 has a human-computer interaction unit 0411, and the human-computer interaction unit 0411 can display the charging reservation interface in response to a charging reservation instruction triggered by a user. As shown in FIG. 4, the charging reservation interface includes a map, and one or more available charging points 11*a* may be displayed on the map. Then, the user may enter or select the charging reservation information in the charging reservation interface, and the in-vehicle charging reservation client 041 obtains the charging reservation information entered or selected by the user. The charging reservation information includes a charging location of the electric vehicle, and the charging location is a location of a target available charging point in the one or more available charging points 11*a*. A process in which the in-vehicle charging reservation client 041 obtains the charging reservation information may be the same as a process in which the in-vehicle charging reservation client 011 obtains the charging reservation information in step 101. Details are not described herein again.

Step 202. The first mobile terminal sends an unlocking information generation request to the electric vehicle.

In this embodiment of this application, after receiving the charging reservation instruction, the first mobile terminal can send the unlocking information generation request to the electric vehicle, where the unlocking information generation request is used to request the electric vehicle to generate target unlocking information of the charging port cover of the electric vehicle.

Optionally, an unlocking information obtaining control may be further displayed in the charging reservation interface of the in-vehicle charging reservation client 041 in the first mobile terminal 04. The in-vehicle charging reservation client 041 may send the unlocking information generation request to the electric vehicle after detecting a selection operation performed by the user on the unlocking information obtaining control. In other words, the first mobile terminal 04 obtains the unlocking information of the charging port cover from the electric vehicle only after receiving the instruction of the user, so as to ensure security of sharing the unlocking information of the charging port cover by the electric vehicle.

For example, as shown in FIG. 6, the in-vehicle charging reservation client 041 further includes a charging request unit 0412, and the charging request unit includes an unlocking information obtaining module 412*a*. The unlocking information obtaining module 412*a* may send the unlocking information generation request to the electric vehicle 01.

Step 203. The electric vehicle generates the target unlocking information of the charging port cover of the electric vehicle.

In this embodiment of this application, the electric vehicle may generate the target unlocking information of the charging port cover of the electric vehicle after receiving the unlocking information generation request sent by the first mobile terminal. For a process in which the electric vehicle generates the target unlocking information of the charging port cover of the electric vehicle, refer to related descriptions in step 102. Details are not described herein again.

Step 204. The electric vehicle sends the target unlocking information of the charging port cover to the first mobile terminal.

As shown in FIG. 6, the in-vehicle communications module 012 of the electric vehicle 01 may send, to the unlocking information obtaining module 412*a* of the first mobile terminal 04, the target unlocking information that is of the charging port cover and that is generated by the electric vehicle 01.

Step 205. The first mobile terminal generates a charging reservation request based on the charging reservation information and the target unlocking information.

After receiving the target unlocking information sent by the electric vehicle, the first mobile terminal may generate the charging reservation request based on the obtained charging reservation information and the target unlocking information. That is, the first mobile terminal may encapsulate the charging reservation information and the target unlocking information to obtain the charging reservation request.

Optionally, refer to FIG. 6. The charging request unit in the in-vehicle charging reservation client 041 further includes a request sending module 412*b*. After receiving the target unlocking information, the unlocking information obtaining module 112*a* may send the target unlocking information to the request sending module 412*b*. The human-computer interaction unit 0411 may further send the obtained charging reservation information to the request sending module 412*b*. The request sending module 412*b* may generate the charging reservation request based on the obtained charging reservation information and the target unlocking information.

Step 206. The first mobile terminal sends the charging reservation request to the charging server.

As shown in FIG. 6, the request sending module 412*b* of the in-vehicle charging reservation client 041 may send the charging reservation request to the charging server 02.

After step 206, the charging server 02 in the charging system may continue to perform the method shown in step 105, step 106, step 108, and step 109, the mobile charging vehicle 03 may perform the method shown in step 107, step 110, and step 113, and the electric vehicle 01 may continue to perform the method shown in step 111 and step 112.

In this embodiment of this application, as shown in FIG. 7, the in-vehicle charging reservation client 041 installed in the first mobile terminal 04 further includes a charging progress query unit 0413 and a charging information query unit 0414. The charging progress query unit 0413 may be configured to send a charging progress query request to the charging query service unit 026, to obtain a progress of a currently ongoing charging service. The charging information query unit 0414 is configured to send a charging information query request to the charging query service unit 026, to obtain related information of a completed historical charging task.

In conclusion, this embodiment of this application provides a charging method. A first mobile terminal may obtain target unlocking information of a charging port cover that is generated by an electric vehicle, and the target unlocking information may be carried in a charging reservation request sent to a charging server. After receiving the charging reservation request, the charging server may send the target unlocking information to a mobile charging vehicle. The mobile charging vehicle may unlock the charging port cover of the electric vehicle based on the target unlocking information when the electric vehicle needs to be charged. Because the user does not need to perform unlocking by using the remote control key, a waiting time of the user in a charging scheduling scenario can be reduced while security is ensured, thereby improving charging flexibility.

In addition, in the solution provided in this embodiment of this application, the first mobile terminal may obtain and share the target unlocking information, thereby effectively improving flexibility of charging reservation. Further, because an operation on the mobile terminal is more convenient and more efficient, efficiency of charging reservation can be further effectively enhanced, and user experience can be improved.

Figures 8, 9:
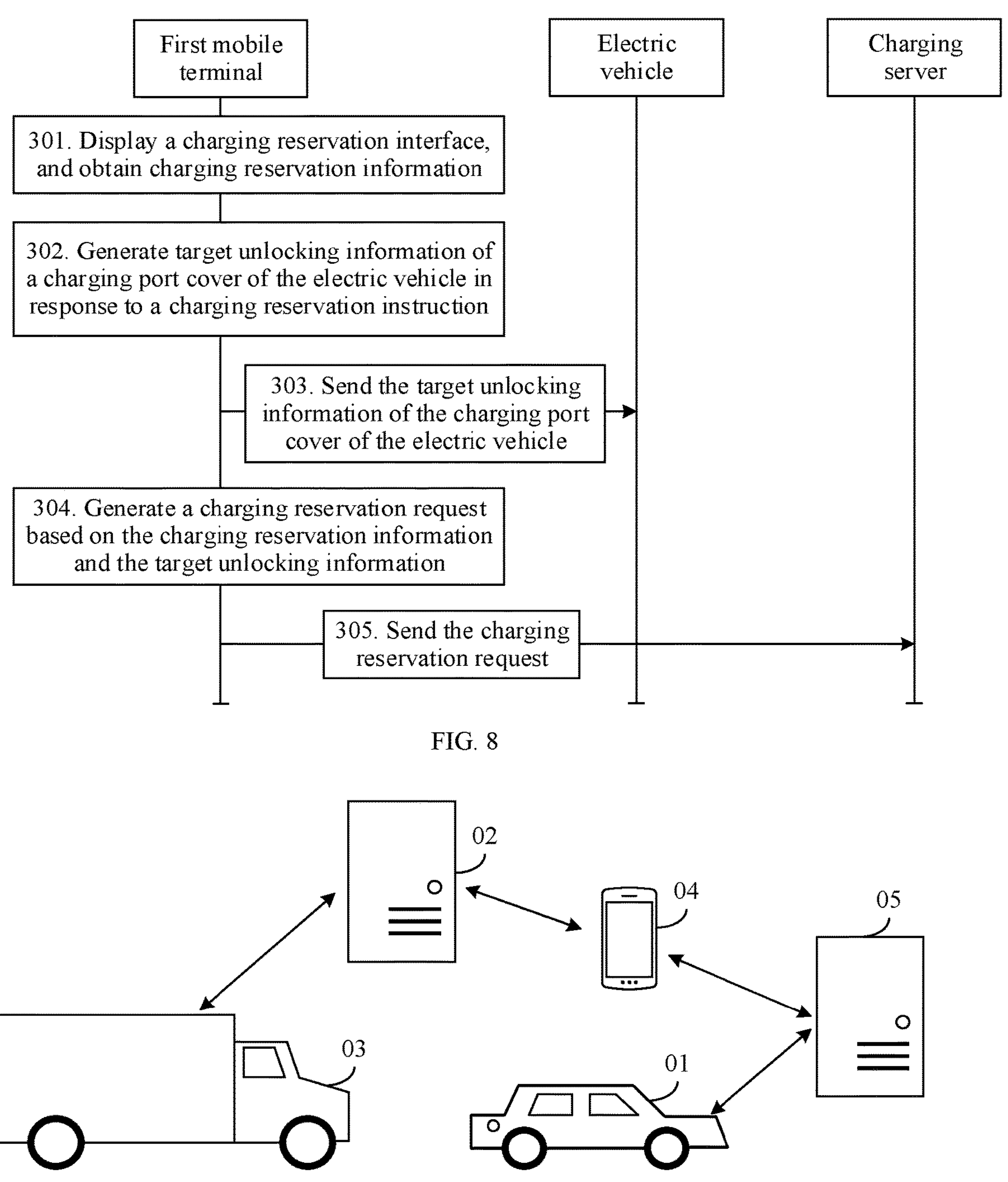
FIG. 8 is a flowchart of still another charging method according to an embodiment of this application.
FIG. 9 is a schematic diagram of a structure of yet still another charging system according to an embodiment of this application.

FIG. 8 is a flowchart of another charging method according to an embodiment of this application. The charging method is described by using an example in which the first mobile terminal 05 generates target unlocking information and sends a charging reservation request, and an unlocking device is the mobile charging vehicle 03. The charging method may be applied to the system shown in FIG. 5. Refer to FIG. 8. The charging method includes the following steps.

Step 301. The first mobile terminal displays a charging reservation interface, and obtains charging reservation information.

For a process in which the first mobile terminal obtains the charging reservation information, refer to related descriptions in step 201.

Step 302. The first mobile terminal generates target unlocking information of the charging port cover of the electric vehicle.

In this embodiment of this application, after detecting a charging reservation instruction triggered by a user, the first mobile terminal may generate the target unlocking information of the charging port cover of the electric vehicle. Optionally, the first mobile terminal may randomly generate a character string as the target unlocking information. Alternatively, the first mobile terminal may use, as the target unlocking information, an account registered by the first mobile terminal in a vehicle management server of the electric vehicle and a password used to log in to the account. Alternatively, the first mobile terminal may display an input box of the target unlocking information in the charging reservation interface. The user may enter a character string in the input box, and the first mobile terminal may use the character string obtained from the input box as the target unlocking information.

Step 303. The first mobile terminal sends the target unlocking information of the charging port cover to the electric vehicle.

The first mobile terminal may send the target unlocking information of the charging port cover generated by the first mobile terminal to the electric vehicle, for the electric vehicle to store the target unlocking information. Optionally, if the charging reservation information obtained by the first mobile terminal further includes a valid time period of the target unlocking information, the first mobile terminal may send both the target unlocking information and the valid time period of the target unlocking information to the electric vehicle, for the electric vehicle to store the target unlocking information and the valid time period.

For example, the unlocking information storage unit 0122 of the electric vehicle 01 may store the target unlocking information sent by the first mobile terminal 04 and the valid time period of the target unlocking information.

Step 304. The first mobile terminal generates a charging reservation request based on the charging reservation information and the target unlocking information.

For a process in which the first mobile terminal generates the charging reservation request, refer to related descriptions in step 205.

Step 305. The first mobile terminal sends the charging reservation request to the charging server.

For a process in which the first mobile terminal sends the charging reservation request, refer to related descriptions in step 206.

After step 305, the charging server 02 in the charging system may continue to perform the method shown in step 105, step 106, step 108, and step 109, the mobile charging vehicle 03 may perform the method shown in step 107, step 110, and step 113, and the electric vehicle 01 may continue to perform the method shown in step 111 and step 112.

In conclusion, this embodiment of this application provides a charging method. A first mobile terminal may generate target unlocking information of a charging port cover of an electric vehicle, send the target unlocking information to the electric vehicle, and the target unlocking information may be carried in a charging reservation request sent to a charging server. After receiving the charging reservation request, the charging server may send the target unlocking information to a mobile charging vehicle. The mobile charging vehicle may unlock the charging port cover of the electric vehicle based on the target unlocking information when the electric vehicle needs to be charged. Because the user does not need to perform unlocking by using the remote control key, a waiting time of the user in a charging scheduling scenario can be reduced while security is ensured, thereby improving charging flexibility.

FIG. 9 is a schematic diagram of a structure of still another charging system according to an embodiment of this application. As shown in FIG. 9, in addition to an electric vehicle 01, a charging server 02, a mobile charging vehicle 03, and a first mobile terminal 04, the system further includes a vehicle management server 05 of the electric vehicle 01. Both the first mobile terminal 04 and the mobile charging vehicle 03 establish a communication connection to the charging server 02, and both the first mobile terminal 04 and the electric vehicle 01 establish a communication connection to the vehicle management server 05.

The vehicle management server 05 is a background server of the electric vehicle 01, and can manage and control the electric vehicle 01. The vehicle management server 05 may be a server, or may be a server cluster including several servers, or may be a cloud computing center.

Figure 10A:
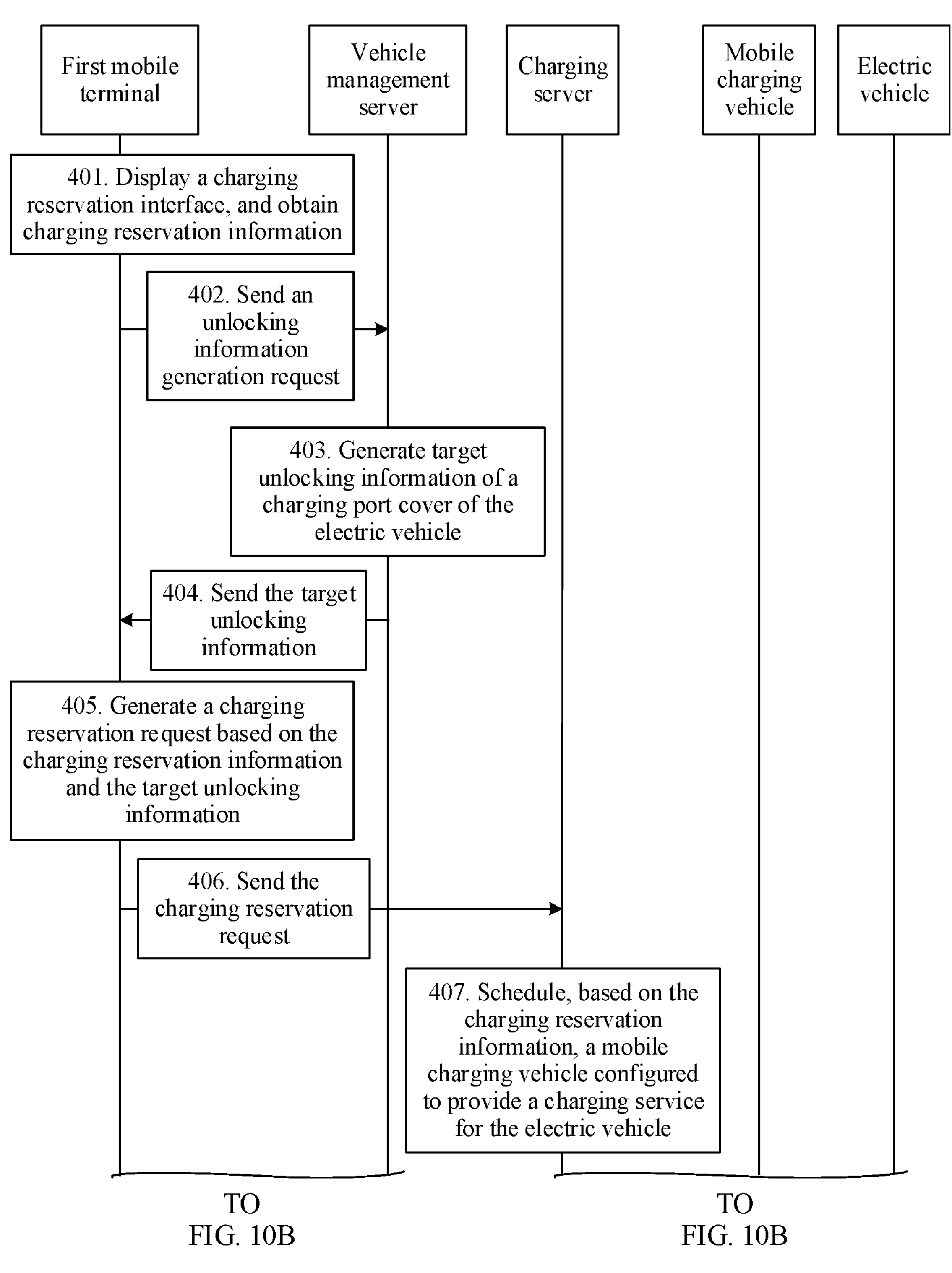
FIG. 10A and FIG. 10B are a flowchart of yet another charging method according to an embodiment of this application.
Figure 10B:
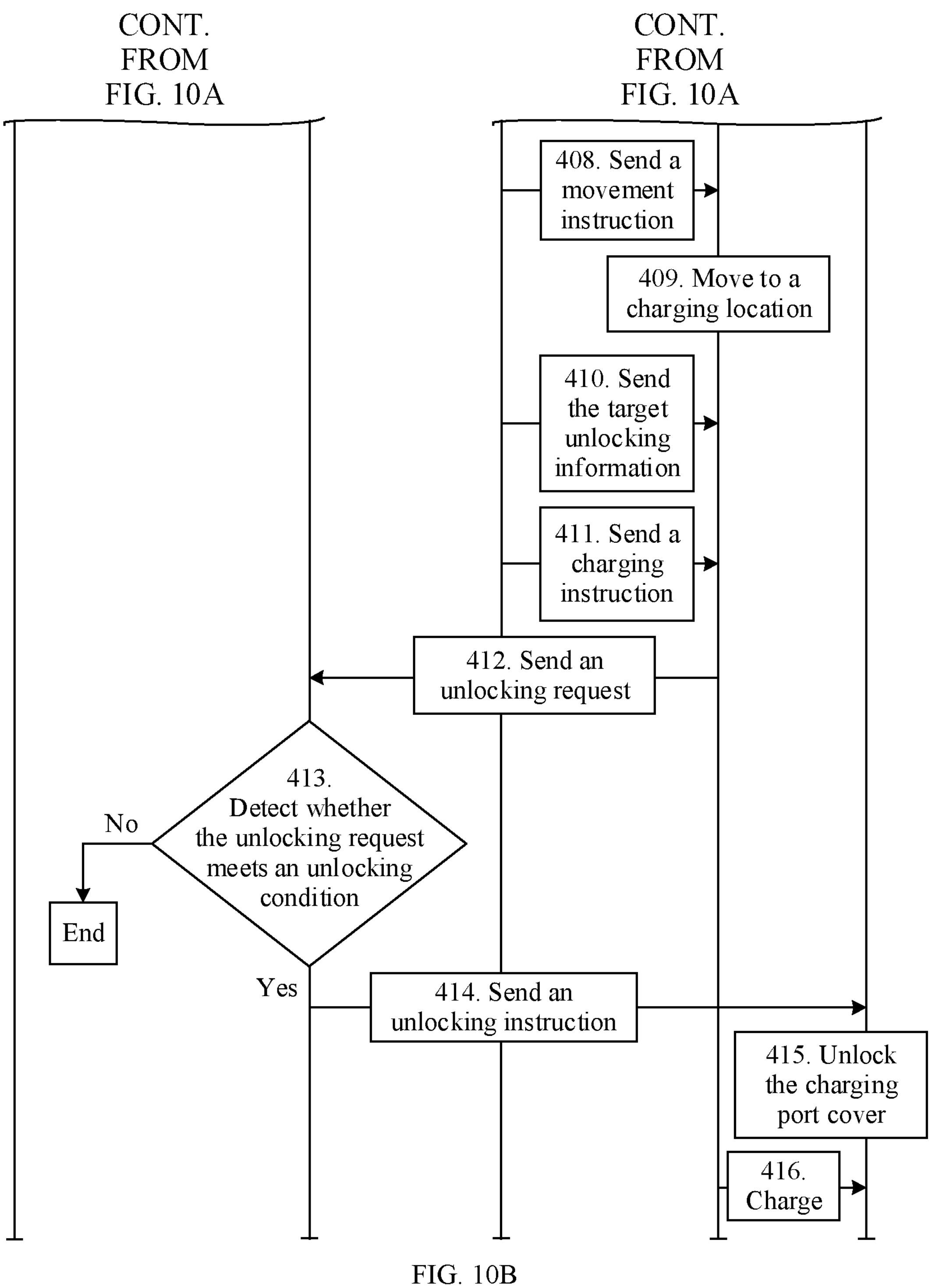

FIG. 10A and FIG. 10B are a flowchart of another charging method according to an embodiment of this application. The charging method is described by using an example in which the vehicle management server 05 generates target unlocking information, the first mobile terminal 05 sends a charging reservation request, and an unlocking device is the mobile charging vehicle 03. The charging method may be applied to the system shown in FIG. 9. Refer to FIG. 10A and FIG. 10B. The charging method includes the following steps.

Step 401. The first mobile terminal displays a charging reservation interface, and obtains charging reservation information.

For a process in which the first mobile terminal obtains the charging reservation information, refer to related descriptions in step 201. In addition, in this embodiment, the charging reservation information obtained by the first mobile terminal further includes an identifier of the electric vehicle. The identifier of the electric vehicle may be a character string that can uniquely indicate the electric vehicle. For example, the identifier may be a license plate of the electric vehicle, or may be a factory number of the electric vehicle.

Optionally, the first mobile terminal may obtain the identifier of the electric vehicle that is entered by the user in the charging reservation interface. Alternatively, the first mobile terminal may directly obtain the identifier of the electric vehicle based on the communication connection established to the electric vehicle.

Step 402. The first mobile terminal sends an unlocking information generation request to the vehicle management server.

In this embodiment of this application, after receiving a charging reservation instruction, the first mobile terminal can send the unlocking information generation request to the vehicle management server, where the unlocking information generation request carries the identifier of the electric vehicle. If the charging reservation information obtained by the first mobile terminal further includes a valid time period of the target unlocking information, the unlocking information generation request also includes the valid time period. The unlocking information generation request is used to request the vehicle management server to generate target unlocking information of the charging port cover of the electric vehicle indicated by the identifier.

For a process in which the first mobile terminal sends the unlocking information generation request to the vehicle management server, refer to related descriptions in step 202. Details are not described herein again.

Step 403. The vehicle management server generates the target unlocking information of the charging port cover of the electric vehicle.

In this embodiment of this application, the vehicle management server may generate the target unlocking information of the charging port cover of the electric vehicle after receiving the unlocking information generation request sent by the first mobile terminal. In addition, the vehicle management server may store a correspondence between the identifier of the electric vehicle and the target unlocking information of the charging port cover of the electric vehicle.

Optionally, the vehicle management server may randomly generate a character string as the target unlocking information. Alternatively, the vehicle management server may use, as the target unlocking information, an account and a password that are of the electric vehicle indicated by the identifier and that are registered in the vehicle management server. Alternatively, the vehicle management server may further use, as the target unlocking information, an account and a password that are registered by the first mobile terminal in the vehicle management server. The account that is of the electric vehicle indicated by the identifier and that is registered in the vehicle management server and the account that is of the first mobile terminal and that is registered in the vehicle management server may be a same account.

Optionally, the unlocking information generation request may further include a valid time period of the target unlocking information; or if the unlocking information generation request does not include a valid time period of the target unlocking information, the vehicle management server may use a preconfigured default time period as the valid time period of the target unlocking information. In a scenario in which the vehicle management server obtains the valid time period of the target unlocking information, the vehicle management server may store a correspondence between the identifier of the electric vehicle, the target unlocking information of the charging port cover, and the valid time period.

Figure 11:
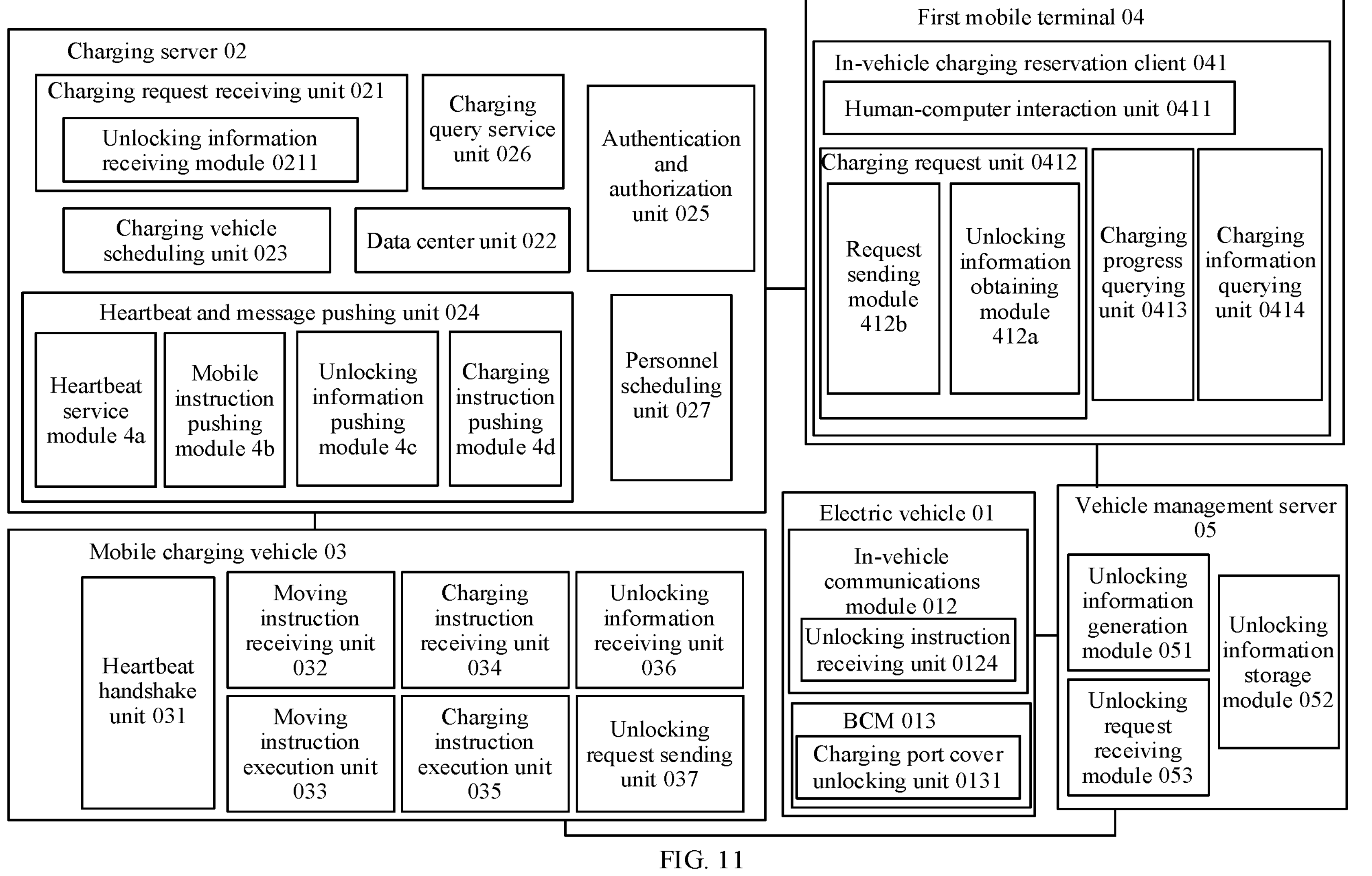
FIG. 11 is a schematic diagram of a structure of a further charging system according to an embodiment of this application.

For example, as shown in FIG. 11, the vehicle management server 05 includes an unlocking information generation module 051 and an unlocking information storage module 052. The unlocking information generation module 051 may generate the target unlocking information of the charging port cover of the electric vehicle 01 in response to the unlocking information generation request sent by the first mobile terminal 04. The unlocking information storage module 052 may store the identifier of the electric vehicle, the target unlocking information, and the valid time period of the target unlocking information.

Step 404. The vehicle management server sends the target unlocking information of the charging port cover to the first mobile terminal.

As shown in FIG. 11, the unlocking information generation module 051 in the vehicle management server 05 may send the target unlocking information of the charging port cover that is generated by the unlocking information generation module 051 to an unlocking information obtaining module 412*a* of the first mobile terminal 04.

Step 405. The first mobile terminal generates a charging reservation request based on the charging reservation information and the target unlocking information.

After receiving the target unlocking information sent by the vehicle management server, the first mobile terminal may generate the charging reservation request based on the obtained charging reservation information and the target unlocking information. For a process in which the first mobile terminal generates the charging reservation request, refer to related descriptions in step 205. Details are not described herein again.

Step 406. The first mobile terminal sends the charging reservation request to the charging server.

Step 407. The charging server schedules, based on the charging reservation information, a mobile charging vehicle configured to provide a charging service for the electric vehicle.

Step 408. The charging server sends a moving instruction to the mobile charging vehicle.

Step 409. The mobile charging vehicle moves to the charging location.

Step 410. The charging server sends the target unlocking information to the mobile charging vehicle.

Step 411. The charging server sends a charging instruction to the mobile charging vehicle.

For implementation processes of step 406 to step 411, refer to related descriptions of step 104 to step 109 in the embodiment shown in FIG. 2. Details are not described herein again.

Step 412. The mobile charging vehicle sends an unlocking request to the vehicle management server.

After receiving the charging instruction, the mobile charging vehicle may send the unlocking request to the vehicle management server of the electric vehicle. The unlocking request carries the target unlocking information received by the mobile charging vehicle and the identifier of the electric vehicle obtained from the received charging reservation information.

Step 413. The vehicle management server detects whether the unlocking request meets an unlocking condition.

After receiving the unlocking request, the vehicle management server may first determine, based on the identifier of the electric vehicle carried in the unlocking request, target unlocking information corresponding to the identifier, that is, determine the target unlocking information of the electric vehicle indicated by the identifier. Then, the vehicle management server may detect, based on the target unlocking information, whether the unlocking request meets the unlocking condition. The unlocking condition includes at least the following condition. The unlocking information carried in the unlocking request matches the target unlocking information of the electric vehicle indicated by the identifier. If the unlocking request meets the unlocking condition, the vehicle management server may perform step 414. If the unlocking request does not meet the unlocking condition, the vehicle management server may end the operation.

Optionally, if the vehicle management server further stores the valid time period of the target unlocking information, the unlocking condition further includes the following condition: A moment at which the unlocking request is received is within the valid time period. Correspondingly, if unlocking information carried in the unlocking request matches the target unlocking information, and a moment at which the unlocking request is received is within the valid time period, the vehicle management server may determine that the unlocking request meets the unlocking condition, and may perform step 414. If the unlocking information carried in the unlocking request does not match the target unlocking information, or the unlocking information matches the target unlocking information, but a moment at which the unlocking request is received is not within the valid time period, the vehicle management server may determine that the unlocking request does not meet the unlocking condition, and therefore may end the operation.

Refer to FIG. 11. The vehicle management server 05 further includes an unlocking request receiving module 053. The unlocking request receiving module 053 is configured to: receive the unlocking request, detect whether the unlocking information carried in the unlocking request matches the target unlocking information that corresponds to the identifier of the electric vehicle and that is stored in the unlocking information storage module 052, and detect whether a moment at which the unlocking request is received is within the valid time period stored in the unlocking information storage module 052. That is, the unlocking request receiving module 053 may detect whether the unlocking request meets the unlocking condition, so that authentication can be performed on the unlocking request.

Step 414: The vehicle management server sends an unlocking instruction to the electric vehicle.

If the vehicle management server determines that the unlocking request is authenticated, the vehicle management server may send the unlocking instruction to the electric vehicle, where the unlocking instruction is used to instruct the electric vehicle to unlock the charging port cover of the electric vehicle.

For example, refer to FIG. 11. The in-vehicle communications module 012 of the electric vehicle 01 further includes an unlocking instruction receiving unit 0124. After determining that the unlocking request is authenticated, the unlocking request receiving module 053 of the vehicle management server 05 may send the unlocking instruction to the unlocking instruction receiving unit 0124.

Step 415. The electric vehicle unlocks the charging port cover.

After receiving the unlocking instruction sent by the vehicle management server, the electric vehicle may unlock the charging port cover of the electric vehicle. For example, as shown in FIG. 11, after receiving the unlocking instruction, the unlocking instruction receiving unit 0124 of the electric vehicle 01 may instruct, by using a VCU, a charging port cover unlocking unit 0131 of the BCM 013 to unlock the charging port cover.

Step 416. The mobile charging vehicle charges the electric vehicle.

After the vehicle management server instructs the electric vehicle to unlock the charging port cover, the charging gun of the mobile charging vehicle may be inserted into the charging port of the electric vehicle, and starts to charge the electric vehicle.

Optionally, in this embodiment of this application, after generating the target unlocking information in step 403, the vehicle management server may alternatively directly send the target unlocking information (or the target unlocking information and the valid time period of the target unlocking information) to the electric vehicle. Correspondingly, after step 411, the mobile charging vehicle may perform the method shown in step 110, that is, the mobile charging vehicle may directly send the unlocking request to the electric vehicle. Then, the electric vehicle may perform the method shown in step 413 and step 415, and step 414 may be deleted.

The foregoing embodiment is described by using an example in which the vehicle management server 05 and the charging server 02 are two servers independent of each other. In an example, the vehicle management server 05 and the charging server 02 may alternatively be a same server, that is, the server may not only provide a vehicle management function, but also provide a charging reservation service function. In a scenario in which the vehicle management server 05 and the charging server 02 are a same server, step 402, step 404, and step 405 may be deleted, and step 403 may be performed after step 406. In other words, the first mobile terminal may directly send the charging reservation request carrying the charging reservation information to the charging server (for example, the vehicle management server), and the charging server may generate the target unlocking information of the charging port cover of the electric vehicle in response to the charging reservation request. Then, the charging server may perform the method shown in step 408, step 410, step 411, step 413, and step 414.

In conclusion, this embodiment of this application provides a charging method. A first mobile terminal may obtain target unlocking information of a charging port cover of an electric vehicle that is generated by a vehicle management server, and the target unlocking information may be carried in a charging reservation request sent to the charging server. After receiving the charging reservation request, the charging server may send the target unlocking information to a mobile charging vehicle. The mobile charging vehicle may request the vehicle management server to unlock the charging port cover of the electric vehicle based on the target unlocking information when the electric vehicle needs to be charged. Because the user does not need to perform unlocking by using a remote control key, a waiting time of the user in a charging scheduling scenario can be reduced while security is ensured, thereby improving charging flexibility.

Figure 12:
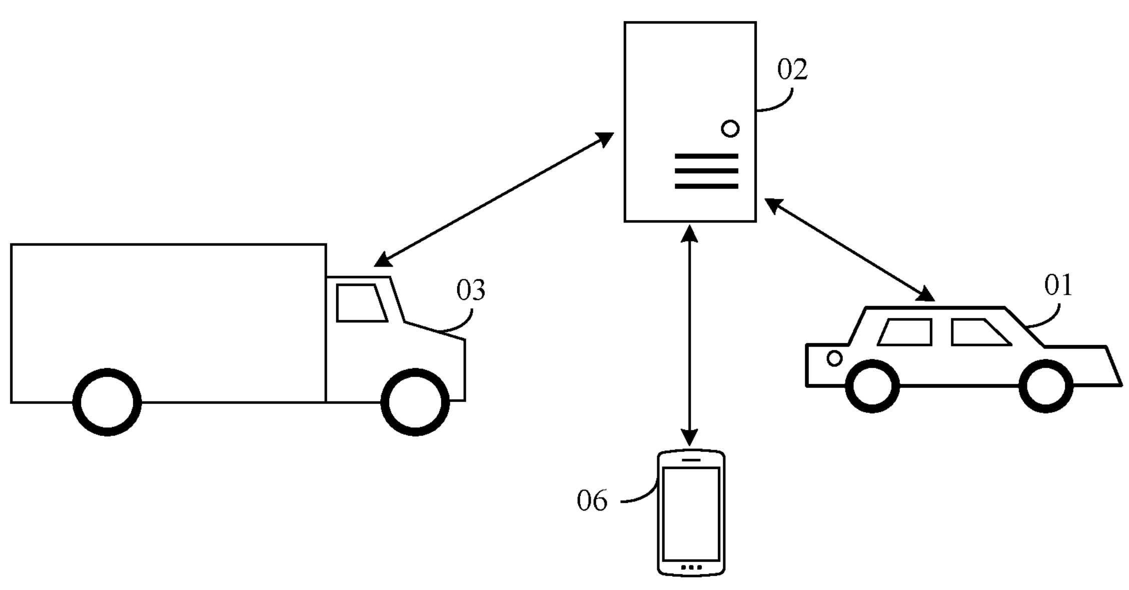
FIG. 12 is a schematic diagram of a structure of a still further charging system according to an embodiment of this application.

FIG. 12 is a schematic diagram of a structure of yet another charging system according to an embodiment of this application. As shown in FIG. 12, in addition to an electric vehicle 01, a charging server 02, and a mobile charging vehicle 03, the system further includes a second mobile terminal 06. The second mobile terminal 06 is a mobile terminal of a charging service person, and the second mobile terminal 06 may be an intelligent device such as a smartphone, a tablet computer, or a wearable device. The electric vehicle 01, the mobile charging vehicle 03, and the second mobile terminal 06 all establish a communication connection to the charging server 02.

Figure 13:
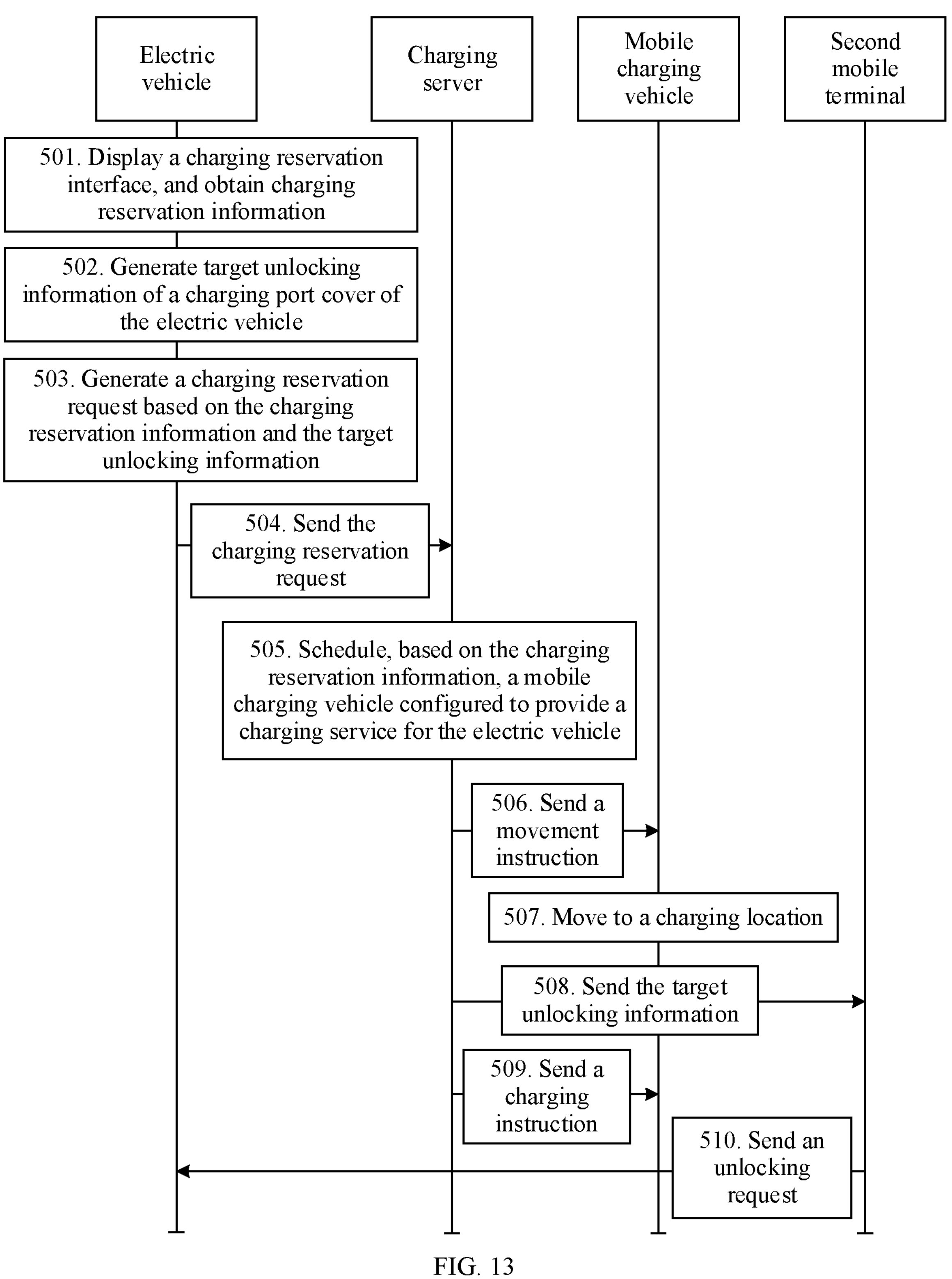
FIG. 13 is a flowchart of yet another charging method according to an embodiment of this application.

FIG. 13 is a flowchart of a charging method according to an embodiment of this application. The charging method is described by using an example in which the electric vehicle 01 generates target unlocking information and sends a charging reservation request, and an unlocking device is the second mobile terminal 06. The charging method may be applied to the system shown in FIG. 12. Refer to FIG. 13. The charging method includes the following steps.

Step 501. The electric vehicle displays a charging reservation interface, and obtains charging reservation information.

Step 502. The electric vehicle generates the target unlocking information of the charging port cover of the electric vehicle.

Step 503. The electric vehicle generates a charging reservation request based on the charging reservation information and the target unlocking information.

Step 504. The electric vehicle sends the charging reservation request to the charging server.

Step 505. The charging server schedules, based on the charging reservation information, a mobile charging vehicle configured to provide a charging service for the electric vehicle.

Step 506. The charging server sends a moving instruction to the mobile charging vehicle.

Step 507. The mobile charging vehicle moves to the charging location.

For implementation processes of step 501 to step 507, refer to related descriptions of step 101 to step 107 in the embodiment shown in FIG. 2. Details are not described herein again.

Step 508. The charging server sends the target unlocking information to the second mobile terminal.

In this embodiment of this application, the charging server further stores information about each charging service person managed by the charging server. The information about each charging service person may include personal information and a location of the charging service person, information about a maintained mobile charging vehicle, related information about a maintenance task, and the like. The personal information of the charging service person may include a name, an age, an employee ID, and the like. The location refers to a current location of the charging service person. The information about the maintained mobile charging vehicle includes at least an identifier of the mobile charging vehicle. Each charging service person may maintain one or more mobile charging vehicles, and each mobile charging vehicle may be maintained by one or more charging service persons. The related information of the maintenance task may include information such as a task number of each charging task (including a completed charging service and a current charging service) maintained by the charging service person, a task execution location (for example, a charging location of the electric vehicle), vehicle information of the electric vehicle, information about a mobile charging vehicle that charges the electric vehicle, and a task progress.

After receiving the charging reservation request sent by the electric vehicle, the charging server may determine, based on the charging reservation information and the information about each charging service person, a charging service person configured to provide a charging service for the electric vehicle from the plurality of charging service persons. Optionally, the charging server may select, based on related information about a maintenance task of each charging service person, a charging service person that is currently not performing a maintenance task from a plurality of charging service persons. Then, the charging server may determine, as a charging service person configured to provide a charging service for the electric vehicle, a charging service person that is closest to the charging location of the electric vehicle and that is in the charging service persons obtained through screening. Then, the charging server may send the target unlocking information to a second mobile terminal of the charging service person.

Figure 14:
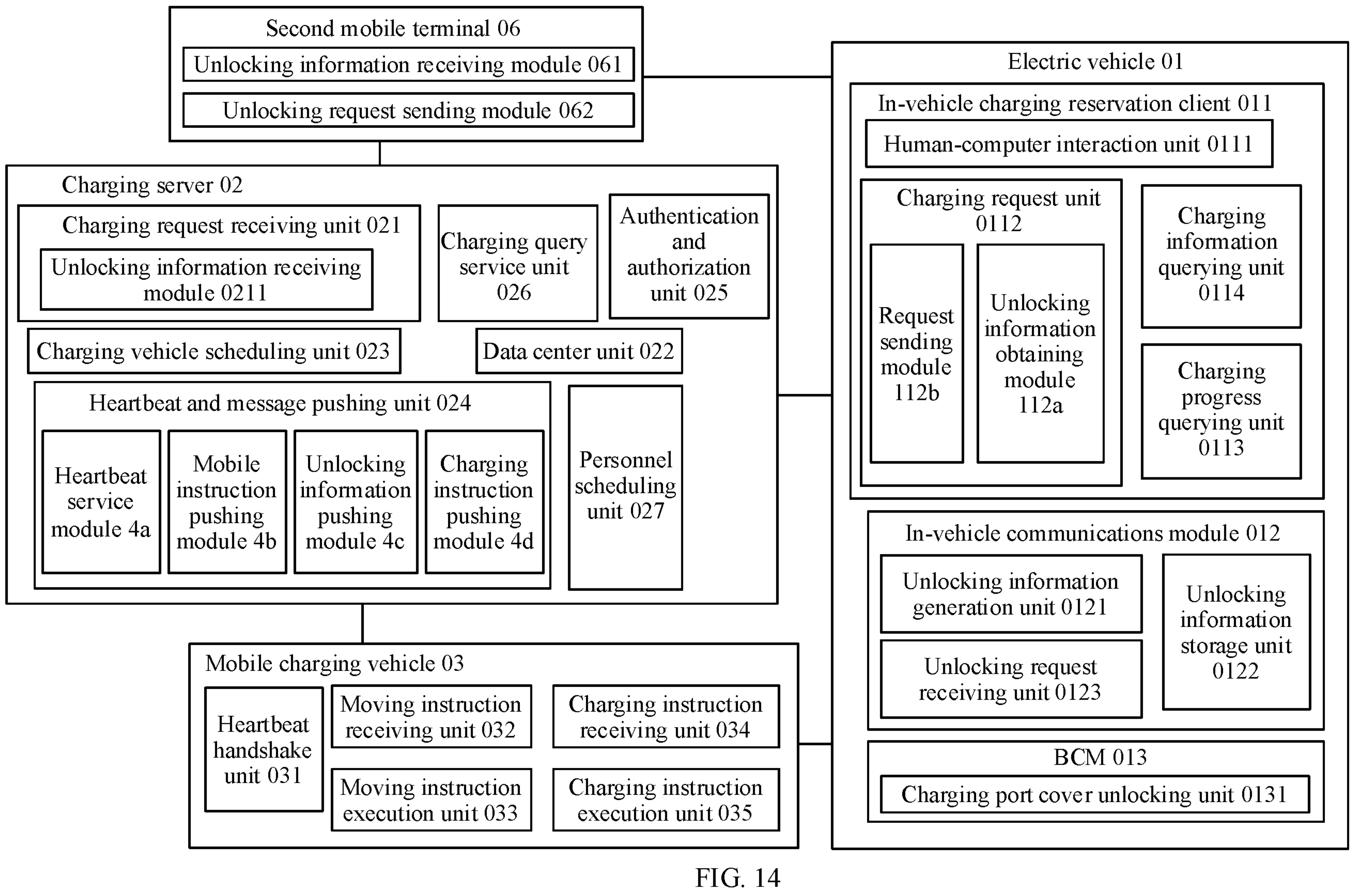
FIG. 14 is a schematic diagram of a structure of a yet further charging system according to an embodiment of this application.

For example, refer to FIG. 14. The second mobile terminal 06 includes an unlocking information receiving module 061. The unlocking information receiving module 061 may be configured to receive target unlocking information sent by an unlocking information pushing module 4*c* of the charging server 02. As shown in FIG. 14, the charging server 02 further includes a personnel scheduling unit 027, and the personnel scheduling unit 027 is configured to communicate with the second mobile terminal 06. That is, the personnel scheduling unit 027 may receive data reported by the second mobile terminal 06 and data pushed to the second mobile terminal 06. The data reported by the second mobile terminal 06 may include: a location of a charging service person, a progress of a maintained charging task, an instruction that needs to be forwarded by the charging server for a mobile charging vehicle, a status change request of the mobile charging vehicle, and the like. The instruction for the mobile charging vehicle may include a movement instruction, a charging instruction, a maintenance instruction, an upgrade instruction, and the like. The data pushed by the personnel scheduling unit 027 to the second mobile terminal 06 includes: related information of a charging task allocated to the charging service person, and a response message for an instruction or a request sent by the second mobile terminal 06. The related information of the charging task may include a charging location, information about a mobile charging vehicle used to provide a charging service, the target unlocking information, and the like.

Step 509. The charging server sends a charging instruction to the mobile charging vehicle.

For an implementation process of step 509, refer to related descriptions in step 109 in the embodiment shown in FIG. 2. Details are not described herein again.

Step 510. The second mobile terminal sends an unlocking request to the electric vehicle.

In this embodiment of this application, the charging service person may drive a mobile charging vehicle to the charging location, or the charging service person may arrive at the charging location by himself or herself. When the charging port cover of the electric vehicle needs to be unlocked, the charging service person may control the second mobile terminal to send the unlocking request carrying the target unlocking information to the electric vehicle, to unlock the charging port cover of the electric vehicle.

For example, refer to FIG. 14. The second mobile terminal 06 further includes an unlocking request sending module 062, and the unlocking request sending module 062 may be configured to send, to the electric vehicle, the unlocking request that carries the target unlocking information.

After step 509, the electric vehicle 01 in the charging system may continue to perform the method shown in step 111 and step 112, and the mobile charging vehicle 03 may perform the method shown in step 113.

Optionally, the charging method provided in the embodiment shown in FIG. 13 may be further combined with the charging method provided in the embodiment shown in FIG. 6, FIG. 8, or FIG. 10A and FIG. 10B. In other words, in a scenario in which the unlocking device is the second mobile terminal, the electric vehicle 01 may generate the target unlocking information, and the first mobile terminal 05 sends the charging reservation request. Alternatively, the first mobile terminal 05 may generate the target unlocking information and send the charging reservation request. Alternatively, the vehicle management server 05 may generate the target unlocking information, and the first mobile terminal 05 sends the charging reservation request.

In conclusion, this embodiment of this application provides a charging method. A charging reservation request received by a charging server includes target unlocking information of a charging port cover of an electric vehicle, and the charging server may send the target unlocking information to a second mobile terminal of a charging service person. The second mobile terminal may unlock the charging port cover of the electric vehicle based on the target unlocking information when the electric vehicle needs to be charged. Because the user does not need to perform unlocking by using a remote control key, a waiting time of the user in a charging scheduling scenario can be reduced while security is ensured, thereby improving charging flexibility.

Figure 15:
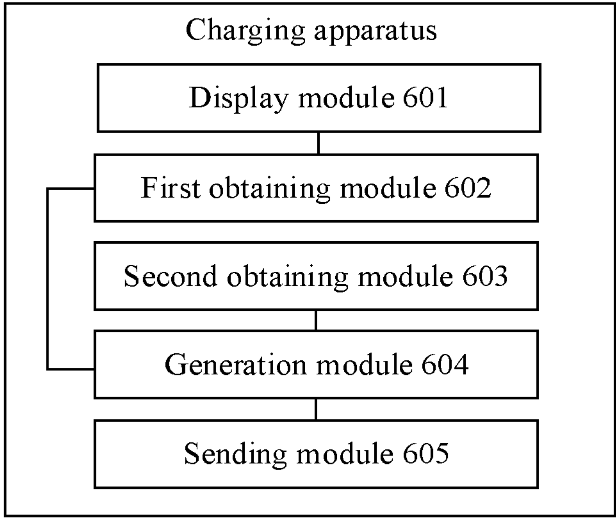
FIG. 15 is a schematic diagram of a structure of a charging apparatus according to an embodiment of this application.

FIG. 15 is a schematic diagram of a structure of a charging apparatus according to an embodiment of this application. The apparatus may be applied to an electric vehicle or a mobile terminal. For example, the apparatus may be applied to the electric vehicle 01 in the system shown in FIG. 1, FIG. 3, FIG. 12, or FIG. 14, or may be applied to the first mobile terminal 04 in the system shown in FIG. 5, FIG. 7, FIG. 9, or FIG. 11. As shown in FIG. 15, the apparatus may include: a display module 601, configured to display a charging reservation interface, where the charging reservation interface includes a map, one or more available charging points are displayed on the map, and for implementation of a function of the display module 601, refer to related descriptions in step 101 or 201 in the foregoing method embodiment; a first obtaining module 602, configured to obtain charging reservation information of the electric vehicle in response to an operation on the charging reservation interface, where the charging reservation information includes at least a charging location of the electric vehicle, the charging location is a location of a target charging point in the one or more available charging points, and for implementation of a function of the first obtaining module 602, refer to related descriptions in step 101 or 201 in the foregoing method embodiment; a second obtaining module 603, configured to obtain target unlocking information of a charging port cover of the electric vehicle, where for implementation of a function of the second obtaining module 603, refer to related descriptions in step 102, step 204, or step 302 in the foregoing method embodiment; a generation module 604, configured to generate a charging reservation request based on the charging reservation information and the target unlocking information, where for implementation of a function of the generation module 604, refer to related descriptions in step 103 or step 205 in the foregoing method embodiment; and a sending module 605, configured to send the charging reservation request to a charging server, where the charging reservation request is used to indicate the charging server to schedule a mobile charging vehicle based on the charging reservation information, and send the target unlocking information to an unlocking device, where the target unlocking information is used by the unlocking device to unlock the charging port cover of the electric vehicle, and for implementation of a function of the sending module 605, refer to related descriptions in step 104 or step 206 in the foregoing method embodiment.

In an optional implementation, the apparatus is applied to an electric vehicle, and the second obtaining module 603 may be configured to: generate target unlocking information of a charging port cover of the electric vehicle in response to an unlocking information generation request; or receive target unlocking information that is of a charging port cover of the electric vehicle and that is sent by a mobile terminal. For implementation of a function of the second obtaining module 603, refer to related descriptions in step 102 or step 303 in the foregoing method embodiment.

Figure 16:
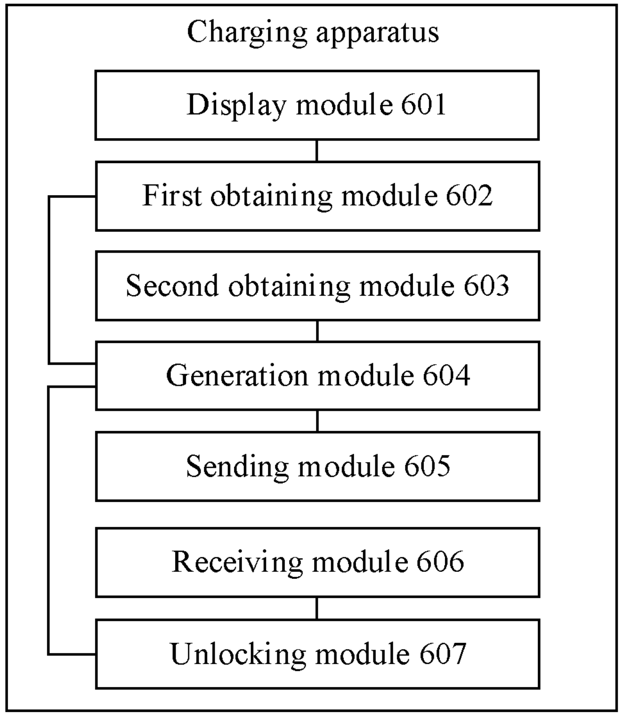
FIG. 16 is a schematic diagram of a structure of another charging apparatus according to an embodiment of this application.

Correspondingly, as shown in FIG. 16, the apparatus may further include: a receiving module 606, configured to receive an unlocking request sent by the unlocking device, where for implementation of a function of the receiving module 606, refer to related descriptions in step 110 or step 510 in the foregoing method embodiment; and an unlocking module 607, configured to unlock the charging port cover if the unlocking request meets an unlocking condition, where the unlocking condition includes at least the following condition: unlocking information carried in the unlocking request matches the target unlocking information, and for function implementation of the unlocking module 607, refer to related descriptions in step 111 and step 112 in the foregoing method embodiment.

Optionally, the charging reservation information further includes a valid time period of the target unlocking information, and the unlocking condition further includes the following condition: A moment at which the unlocking request is received is within the valid time period.

In another optional implementation, the apparatus is applied to a mobile terminal, and the second obtaining module 603 may be configured to: send an unlocking information generation request to an electric vehicle, and receive target unlocking information that is of a charging port cover of the electric vehicle and that is sent by the electric vehicle; or send an unlocking information generation request to a vehicle management server of an electric vehicle, and receive target unlocking information that is of a charging port cover of the electric vehicle and that is sent by the vehicle management server. For implementation of a function of the second obtaining module 603, refer to related descriptions in step 202 and step 204 in the foregoing method embodiment, or refer to related descriptions in step 402 and step 404.

In still another optional implementation, the apparatus is applied to a mobile terminal, and the second obtaining module 603 may be configured to: generate target unlocking information of a charging port cover of an electric vehicle in response to a charging reservation instruction. For implementation of a function of the second obtaining module 603, refer to related descriptions in step 302 in the foregoing method embodiment.

Correspondingly, the sending module 605 may be further configured to send the target unlocking information to the electric vehicle. For implementation of a function of the sending module 605, refer to related descriptions in step 303 in the foregoing method embodiment.

Optionally, the target unlocking information is a randomly generated character string; or the target unlocking information includes an account registered in a vehicle management server of the electric vehicle and a password used to log in to the account.

In conclusion, an embodiment of this application provides a charging apparatus. The apparatus may obtain target unlocking information of a charging port cover of an electric vehicle, and the target unlocking information may be carried in a charging reservation request sent to a charging server. After receiving the charging reservation request, the charging server may send the target unlocking information to the unlocking device. In this way, when the electric vehicle needs to be charged by using the mobile charging vehicle, the unlocking device may unlock the charging port cover of the electric vehicle based on the target unlocking information. Because the user does not need to perform unlocking by using a remote control key, a waiting time of the user in a charging scheduling scenario can be reduced while security is ensured, thereby improving charging flexibility.

Figure 17:
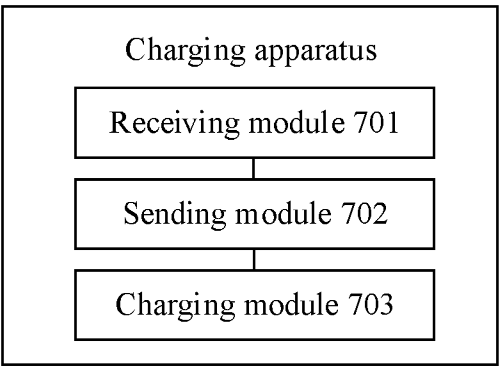
FIG. 17 is a schematic diagram of a structure of still another charging apparatus according to an embodiment of this application.

FIG. 17 is a schematic diagram of a structure of another charging apparatus according to an embodiment of this application. The apparatus may be applied to a mobile charging vehicle. For example, the apparatus may be applied to the mobile charging vehicle 03 in the system shown in FIG. 1, FIG. 3, FIG. 5, FIG. 7, FIG. 9, or FIG. 11. As shown in FIG. 17, the apparatus may include: a receiving module 701, configured to receive charging reservation information that is of an electric vehicle and that is sent by a charging server, and target unlocking information of a charging port cover of the electric vehicle, where the charging reservation information at least includes a charging location of the electric vehicle, and for implementation of a function of the receiving module 701, refer to related descriptions in step 106, step 108, and step 109 in the foregoing method embodiment; a sending module 702, configured to send an unlocking request to the electric vehicle after the mobile charging vehicle moves to the charging location, where the unlocking request carries the target unlocking information, and for function implementation of the sending module 702, refer to related descriptions in step 110 in the foregoing method embodiment; and a charging module 703, configured to charge the electric vehicle after the charging port cover is opened, where for implementation of a function of the charging module 703, refer to related descriptions in step 113 in the foregoing method embodiment.

In conclusion, an embodiment of this application provides a charging apparatus applied to a mobile charging vehicle. The apparatus may receive charging reservation information of an electric vehicle and target unlocking information of a charging port cover of the electric vehicle that are sent by a charging server. The mobile charging vehicle may unlock the charging port cover of the electric vehicle based on the target unlocking information when the electric vehicle needs to be charged. Because the user does not need to perform unlocking by using a remote control key, a waiting time of the user in a charging scheduling scenario can be reduced while security is ensured, thereby improving charging flexibility.

Figure 18:
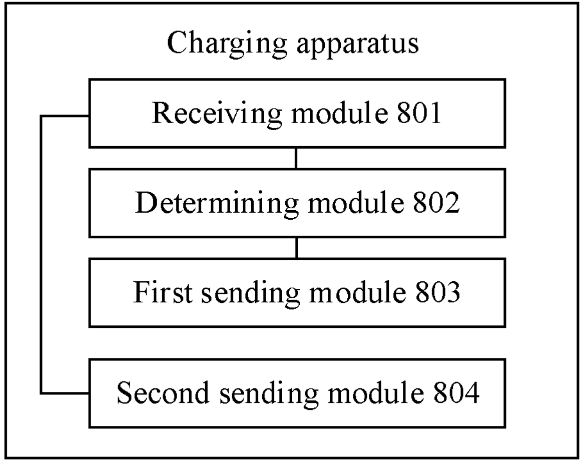
FIG. 18 is a schematic diagram of a structure of yet another charging apparatus according to an embodiment of this application.

FIG. 18 is a schematic diagram of a structure of yet another charging apparatus according to an embodiment of this application. The apparatus may be applied to a charging server. For example, the apparatus may be applied to the charging server 02 in the system shown in FIG. 1, FIG. 3, FIG. 5, FIG. 7, FIG. 9, FIG. 11, FIG. 12, or FIG. 14. As shown in FIG. 18, the apparatus may include: a receiving module 801, configured to receive a charging reservation request, where the charging reservation request includes charging reservation information of an electric vehicle and target unlocking information of a charging port cover of the electric vehicle, the charging reservation information includes at least a charging location of the electric vehicle, and for implementation of a function of the receiving module 801, refer to related descriptions in step 104 or step 206 in the foregoing method embodiment; a determining module 802, configured to schedule, based on the charging reservation information, a mobile charging vehicle used to charge the electric vehicle, where for implementation of a function of the determining module 802, refer to related descriptions in step 105 in the foregoing method embodiment; a first sending module 803, configured to send the charging location to the mobile charging vehicle, where for implementation of a function of the first sending module 803, refer to related descriptions in step 106 in the foregoing method embodiment; and a second sending module 804, configured to send the target unlocking information to an unlocking device, where the target unlocking information is used by the unlocking device to unlock the charging port cover of the electric vehicle, and for implementation of a function of the second sending module 804, refer to related descriptions in step 108 in the foregoing method embodiment.

In conclusion, an embodiment of this application provides a charging apparatus applied to a charging server. A charging reservation request received by the apparatus includes target unlocking information of a charging port cover of an electric vehicle. The apparatus may send the target unlocking information to an unlocking device. In this way, when the electric vehicle needs to be charged by using a mobile charging vehicle, the unlocking device may unlock the charging port cover of the electric vehicle based on the target unlocking information. Because a user does not need to perform unlocking by using a remote control key, a waiting time of the user in a charging scheduling scenario can be reduced while security is ensured, thereby improving charging flexibility.

Figure 19:
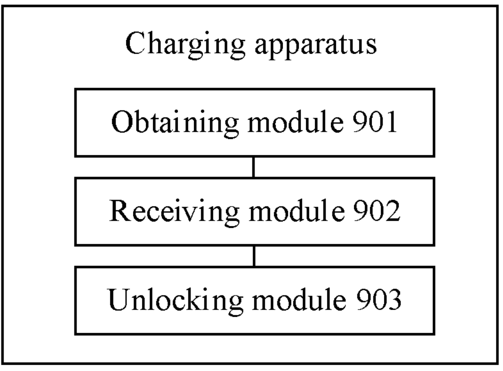
FIG. 19 is a schematic diagram of a structure of yet still another charging apparatus according to an embodiment of this application.

FIG. 19 is a schematic diagram of a structure of yet still another charging apparatus according to an embodiment of this application. The apparatus may be applied to an electric vehicle. For example, the apparatus may be applied to the electric vehicle 01 in the system shown in FIG. 1, FIG. 3, FIG. 5, FIG. 7, FIG. 9, FIG. 11, FIG. 12, or FIG. 14. As shown in FIG. 19, the apparatus may include: an obtaining module 901, configured to obtain target unlocking information of a charging port cover of the electric vehicle, where for implementation of a function of the obtaining module 901, refer to related descriptions in step 102 or step 303 in the foregoing method embodiment; a receiving module 902, configured to receive an unlocking request sent by an unlocking device, where for implementation of a function of the receiving module 902, refer to related descriptions in step 110 in the foregoing method embodiment; and an unlocking module 903, configured to unlock the charging port cover if the unlocking request meets an unlocking condition, where the unlocking condition includes at least the following condition: unlocking information carried in the unlocking request matches the target unlocking information, and for function implementation of the unlocking module 903, refer to related descriptions in step 111 and step 112 in the foregoing method embodiment.

In conclusion, an embodiment of this application provides a charging apparatus applied to an electric vehicle. The apparatus may generate and store target unlocking information of a charging port cover of the electric vehicle. When the electric vehicle needs to be charged by using a mobile charging vehicle, an unlocking device may request, based on the target unlocking information, the apparatus to unlock the charging port cover of the electric vehicle. Because a user does not need to perform unlocking by using a remote control key, a waiting time of the user in a charging scheduling scenario can be reduced while security is ensured, thereby improving charging flexibility.

Figure 20:
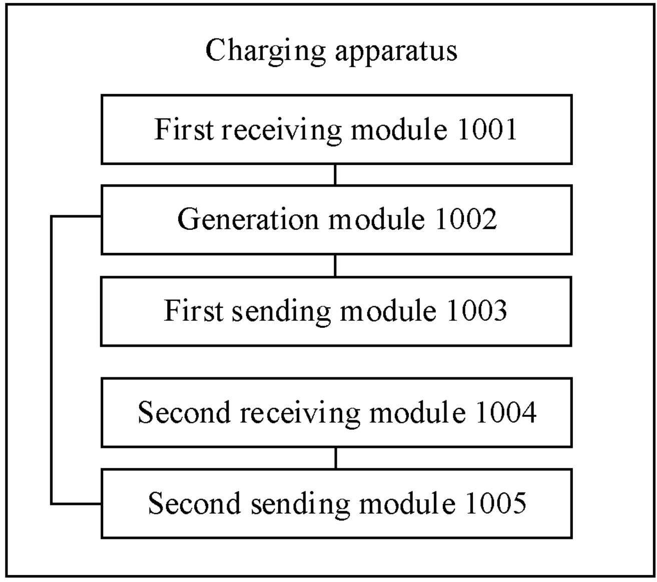
FIG. 20 is a schematic diagram of a structure of a further charging apparatus according to an embodiment of this application.

FIG. 20 is a schematic diagram of a structure of a further charging apparatus according to an embodiment of this application. The apparatus may be applied to a vehicle management server of an electric vehicle. For example, the apparatus may be applied to the vehicle management server 05 in the system shown in FIG. 9 or FIG. 11. As shown in FIG. 20, the apparatus may include: a first receiving module 1001, configured to receive an unlocking information generation request sent by a mobile terminal, where the unlocking information generation request includes an identifier of the electric vehicle, and for implementation of a function of the first receiving module 1001, refer to related descriptions in step 402 in the foregoing method embodiment; a generation module 1002, configured to generate target unlocking information of a charging port cover of the electric vehicle indicated by the identifier, where for implementation of a function of the generation module 1002, refer to related descriptions in step 403 in the foregoing method embodiment; a first sending module 1003, configured to send the target unlocking information to the mobile terminal, where the target unlocking information is sent by the mobile terminal to a charging server, and is sent to an unlocking device by the charging server, and for implementation of a function of the first sending module 1003, refer to related descriptions in step 404 in the foregoing method embodiment; a second receiving module 1004, configured to receive an unlocking request sent by the unlocking device, where the unlocking request includes the identifier of the electric vehicle and unlocking information, and for implementation of a function of the second receiving module 1004, refer to related descriptions in step 412 in the foregoing method embodiment; and a second sending module 1005, configured to: if the unlocking request meets an unlocking condition, send an unlocking instruction to the electric vehicle, where the unlocking instruction is used to instruct to unlock the charging port cover of the electric vehicle, and the unlocking condition includes at least the following condition that the unlocking information carried in the unlocking request matches the target unlocking information, and for implementation of a function of the second sending module 1005, refer to related descriptions in step 413 and step 414 in the foregoing method embodiment.

In conclusion, an embodiment of this application provides a charging apparatus applied to a vehicle management server. The apparatus may generate and store target unlocking information of a charging port cover of an electric vehicle. When the electric vehicle needs to be charged by using a mobile charging vehicle, an unlocking device may unlock the charging port cover of the electric vehicle based on the target unlocking information. Because a user does not need to perform unlocking by using a remote control key, a waiting time of the user in a charging scheduling scenario can be reduced while security is ensured, thereby improving charging flexibility.

Figure 21:
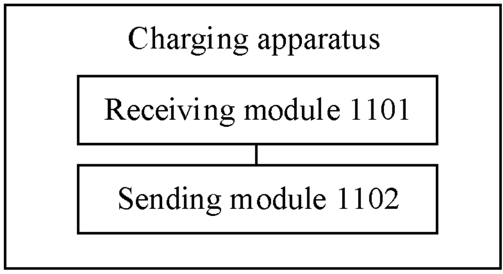
FIG. 21 is a schematic diagram of a structure of a still further charging apparatus according to an embodiment of this application.

FIG. 21 is a schematic diagram of a structure of a still further charging apparatus according to an embodiment of this application. The apparatus may be applied to a second mobile terminal. For example, the apparatus may be applied to the second mobile terminal 06 in the system shown in FIG. 12 or FIG. 14. As shown in FIG. 21, the apparatus may include: a receiving module 1101, configured to receive target unlocking information that is of a charging port cover of an electric vehicle and that is sent by a charging server, where for implementation of a function of the receiving module 1101, refer to related descriptions in step 508 in the foregoing method embodiment; and a sending module 1102, configured to send an unlocking request to the electric vehicle, where the unlocking request carries the target unlocking information, and for implementation of a function of the sending module 1102, refer to related descriptions in step 510 in the foregoing method embodiment.

In conclusion, an embodiment of this application provides a charging apparatus applied to a second mobile terminal. The apparatus may obtain and store target unlocking information of a charging port cover of an electric vehicle. When the electric vehicle needs to be charged by using a mobile charging vehicle, the apparatus may unlock the charging port cover of the electric vehicle based on the target unlocking information. Because a user does not need to perform unlocking by using a remote control key, a waiting time of the user in a charging scheduling scenario can be reduced while security is ensured, thereby improving charging flexibility.

It should be understood that the charging apparatus provided in this embodiment of this application may be implemented by using an application-specific integrated circuit (ASIC) or a programmable logic device (PLD). The PLD may be a complex programmable logic device (CPLD), a field-programmable gate array (FPGA), generic array logic (GAL), or any combination thereof. In an example, the charging method provided in the foregoing method embodiment may alternatively be implemented by using software. When the charging method provided in the foregoing method embodiment is implemented by using software, modules in the charging apparatus may also be software modules.

Figure 22:
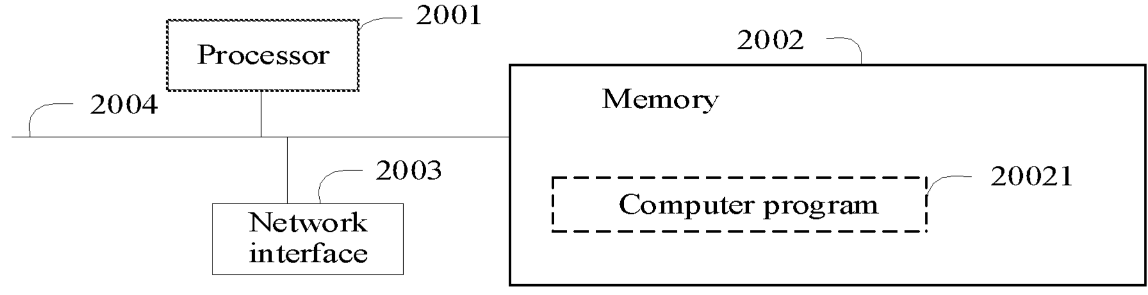
FIG. 22 is a schematic diagram of a structure of a yet further charging apparatus according to an embodiment of this application.

FIG. 22 is a schematic diagram of a structure of a yet further charging apparatus according to an embodiment of this application. As shown in FIG. 22, the charging apparatus may include a processor 2101, a memory 2102, a network interface 2103, and a bus 2104. The bus 2104 is configured to connect the processor 2101, the memory 2102, and the network interface 2103. A communication connection to another component may be implemented by using the network interface 2103 (which may be wired or wireless). The memory 2102 stores a computer program 21021, and the computer program 21021 is configured to implement various application functions.

It should be understood that, in this embodiment of this application, the processor 2101 may be a CPU, or the processor 2101 may be another general purpose processor, a digital signal processor (DSP), an ASIC, an FPGA, a general purpose processor (GPU), or another programmable logic device, a discrete gate or transistor logic device, a discrete hardware component, or the like. The GPU may be a microprocessor, or may be any conventional processor, or the like.

The memory 2102 may be a volatile memory or a non-volatile memory, or may include both a volatile memory and a non-volatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random-access memory (RAM) and is used as an external cache. By way of example but not limitation, many forms of RAMs are available, such as a static random-access memory (SRAM), a dynamic random access memory (DRAM), a synchronous dynamic random-access memory (SDRAM), a double data rate synchronous dynamic random-access memory (DDR SDRAM), an enhanced synchronous dynamic random-access memory (ESDRAM), a SynchLink dynamic random-access memory (SLDRAM), and a direct Rambus random-access memory (DR RAM).

In addition to a data bus, the bus 2104 may further include a power bus, a control bus, a status signal bus, and the like. However, for clear description, various buses are marked as the bus 2104 in the figure.

The processor 2101 is configured to execute the computer program stored in the memory 2102, and the processor 2101 executes the computer program 21021 to implement the method that is shown in the foregoing method embodiments and that is applied to an electric vehicle, a mobile terminal, a charging server, a mobile charging vehicle, or a vehicle management server.

An embodiment of this application provides a charging system. As shown in FIG. 1 and FIG. 3, the system may include: an electric vehicle 01, a charging server 02, and a mobile charging vehicle 03. The charging server 02 establishes a communication connection to each of the electric vehicle 01 and the mobile charging vehicle 03.

The electric vehicle 01 includes the apparatus shown in FIG. 15, FIG. 16, or FIG. 19. The charging server 02 includes the apparatus shown in FIG. 18. The mobile charging vehicle 03 includes the apparatus shown in FIG. 17.

An embodiment of this application provides another charging system. As shown in FIG. 5 and FIG. 7, the system may include: an electric vehicle 01, a charging server 02, a mobile charging vehicle 03, and a first mobile terminal 04. The charging server 02 establishes a communication connection to each of the mobile charging vehicle 03 and the first mobile terminal 04.

The electric vehicle 01 includes the apparatus shown in FIG. 19. The charging server 02 includes the apparatus shown in FIG. 18. The mobile charging vehicle 03 includes the apparatus shown in FIG. 17. The first mobile terminal 04 includes the apparatus shown in FIG. 15.

An embodiment of this application provides still another charging system. As shown in FIG. 9 and FIG. 11, the system may include: an electric vehicle 01, a charging server 02, a mobile charging vehicle 03, a first mobile terminal 04, and a vehicle management server 05. The charging server 02 establishes a communication connection to each of the mobile charging vehicle 03 and the first mobile terminal 04, and the vehicle management server 05 establishes a communication connection to each of the electric vehicle 01 and the first mobile terminal 04.

The electric vehicle 01 includes the apparatus shown in FIG. 19. The charging server 02 includes the apparatus shown in FIG. 18. The mobile charging vehicle 03 includes the apparatus shown in FIG. 17. The first mobile terminal 04 includes the apparatus shown in FIG. 15. The vehicle management server 05 includes the apparatus shown in FIG. 20.

An embodiment of this application provides yet another charging system. The system includes: an electric vehicle 01, a charging server 02, a mobile charging vehicle 03, and a second mobile terminal 06. The charging server 02 establishes a communication connection to each of the mobile charging vehicle 03 and the second mobile terminal 06.

The electric vehicle 01 may include the apparatus shown in FIG. 15, FIG. 16, or FIG. 19. The charging server 02 includes the apparatus shown in FIG. 18. The second mobile terminal 06 includes the apparatus shown in FIG. 21.

An embodiment of this application further provides a computer-readable storage medium. The computer-readable storage medium stores instructions. When the instructions are run on a computer, the computer is enabled to perform the methods according to the foregoing method embodiments.

An embodiment of this application further provides a computer program product including instructions. When the computer program product is run on a computer, the computer is enabled to perform the methods according to the foregoing method embodiments.

All or some of the foregoing embodiments may be implemented by using software, hardware, firmware, or any combination thereof. When software is used to implement the foregoing embodiments, all or some of the embodiments may be implemented in a form of a computer program product. The computer program product includes one or more computer instructions. When the computer program instructions are loaded or executed on a computer, all or some of the procedures or functions according to embodiments of this application are generated. The computer may be a general purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a web site, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a Digital Video Disk (DVD)), or a semiconductor medium. The semiconductor medium may be a solid-state drive (SSD).

In this application, the terms such as "first" and "second" are used to distinguish between same or similar items whose effects and functions are basically the same. It should be understood that there is no logical or time-sequence dependency between "first", "second", and "$n^{th}$", and a quantity and an execution sequence are not limited, either. It should also be understood that although terms such as first and second are used in the following description to describe various elements, these elements should not be limited by the terms. These terms are merely used to distinguish one element from another element. For example, without departing from the scope of the various examples, a first image may be referred to as a second image, and similarly, a second image may be referred to as a first image. Both the first image and the second image may be images, and in some cases, may be separate and different images.

The term "at least one" in this application means one or more, and the term "a plurality of" in this application means two or more. For example, "a plurality of second packets" means two or more second packets. The terms "system" and "network" may be used interchangeably in this specification.

The foregoing descriptions are optional implementations of this application, and are not intended to limit the protection scope of this application. Any modification or replacement by a person skilled in the art within the technical scope disclosed in this application shall fall within the protection scope of this application. Therefore, the protection scope of this application shall be subject to the protection scope of the claims.

What is claimed is:

1. A charging method comprising:

displaying a charging reservation interface, wherein the charging reservation interface comprises a map that displays one or more available charging points;

receiving an operation on the charging reservation interface;

obtaining charging reservation information of an electric vehicle in response to the operation, wherein the charging reservation information comprises a charging location of the electric vehicle, and wherein the charging location is a location of a target charging point in the one or more available charging points;

obtaining target unlocking information of a charging port cover of the electric vehicle, wherein the target unlocking information is a randomly generated character string, or comprises an account registered with a vehicle management server of the electric vehicle and a password used to log in to the account, wherein obtaining the target unlocking information comprises:

receiving, (a) from the electric vehicle, the target unlocking information of the charging port cover in response to an unlocking information generation request; or receiving, (b) from a mobile terminal, the unlocking information generation request at a vehicle management server of the electric vehicle, and receiving the target unlocking information that is of the charging port cover of the electric vehicle and that is from the vehicle management server;

after receiving (a) or (b), generating a charging reservation request based on the charging reservation information and the target unlocking information; and sending the charging reservation request to a charging server comprising a computing system, wherein the charging reservation request instructs the charging server to schedule a mobile charging vehicle at the charging location based on the charging reservation information and to send the target unlocking information to an unlocking device on the mobile charging vehicle after detecting the mobile charging vehicle at the charging location.

2. The charging method of claim 1, further comprising:

receiving, by the electric vehicle, an unlocking request from the unlocking device; and unlocking, by the electric vehicle, the charging port cover when the unlocking request meets an unlocking condition, wherein the unlocking condition includes that unlocking information carried in the unlocking request matches the target unlocking information.

3. The charging method of claim 2, wherein the charging reservation information further comprises a valid time period of the target unlocking information, and wherein the unlocking condition further includes a moment at which the unlocking request is received is within the valid time period.

4. The charging method of claim 2, further comprising receiving, by the electric vehicle, an unlocking request after the mobile charging vehicle is at the charging location.

5. The charging method of claim 1, wherein the charging reservation information further comprises at least one of a charging time period, vehicle information, or charging requirement information.

6. The charging method of claim 1, further comprising displaying the charging reservation interface with the map that displays a location of a mobile charging vehicle near a current location of the electric vehicle.

7. A charging method, comprising:

receiving, from an electric vehicle or a vehicle management server, a charging reservation request, and receiving, from the vehicle management server, target unlocking information of a charging port cover of the electric vehicle, wherein the charging reservation request comprises charging reservation information of the electric vehicle and the target unlocking information of the charging port cover of the electric vehicle, wherein the target unlocking information is a randomly generated character string, or comprises an account registered with the vehicle management server of the electric vehicle and a password for the account, wherein the charging reservation information comprises a charging location of the electric vehicle, and wherein the charging location is a location of a target charging point of one or more available charging points;

scheduling, based on the charging reservation information, a mobile charging vehicle at the charging location for charging the electric vehicle;

sending the charging location to the mobile charging vehicle; and sending, by a computing system, the target unlocking information to an unlocking device on the mobile charging vehicle after detecting the mobile charging vehicle at the charging location.

8. The charging method of claim 7, wherein the target unlocking information is based on an unlocking information generation request.

9. The charging method of claim 8, wherein the charging reservation information further comprises a valid time period of the target unlocking information.

10. The charging method of claim 7, wherein the charging reservation information further comprises a charging time period.

11. The charging method of claim 7, further comprising receiving, from the mobile charging vehicle, the unlocking request.

12. The charging method of claim 11, wherein the unlocking request includes an identifier of the electric vehicle and unlocking information.

13. The charging method of claim 12, further comprising sending, to the electric vehicle, an unlocking instruction instructing the electric vehicle to unlock the charging port cover.

14. A charging apparatus, comprising:

a computer-readable storage medium configured to store instructions; and a processor coupled to the computer-readable storage medium and configured to execute the instructions to cause the charging apparatus to:

receive, from an electric vehicle or a vehicle management server, a charging reservation request, and receive, from the vehicle management server, target unlocking information of a charging port cover of the electric vehicle, wherein the charging reservation request comprises charging reservation information of the electric vehicle and the target unlocking information of the charging port cover of the electric vehicle, wherein the target unlocking information is a randomly generated character string, or comprises an account registered with the vehicle management server of the electric vehicle and a password for the account, and wherein the charging reservation information comprises at least a charging location of the electric vehicle;

schedule, based on the charging reservation information, a mobile charging vehicle at the charging location for charging the electric vehicle;

send the charging location to the mobile charging vehicle; and send the target unlocking information to an unlocking device on the mobile charging vehicle after detecting the mobile charging vehicle at the charging location.

15. The charging apparatus of claim 14, wherein the target unlocking information is based on an unlocking information generation request.

16. The charging apparatus of claim 15, wherein the charging reservation information further comprises a valid time period of the target unlocking information.

17. The charging apparatus of claim 14, wherein the charging reservation information further comprises a charging time period.

18. The charging apparatus of claim 14, wherein the instructions, when executed by the processor, further cause the charging apparatus to display a charging reservation interface, wherein the charging reservation interface comprises a map that displays one or more available charging points.

19. The charging apparatus of claim 18, wherein the instructions, when executed by the processor, further cause the charging apparatus to receive an operation on the charging reservation interface.

* * * * *